(12) United States Patent
Rolando et al.

(10) Patent No.: US 11,375,005 B1
(45) Date of Patent: Jun. 28, 2022

(54) HIGH AVAILABILITY SOLUTIONS FOR A SECURE ACCESS SERVICE EDGE APPLICATION

(71) Applicant: VMware, Inc., Palo Alto, CA (US)

(72) Inventors: Pierluigi Rolando, Santa Clara, CA (US); Jayant Jain, Cupertino, CA (US); Raju Koganty, San Jose, CA (US); Shadab Shah, Sunnyvale, CA (US); Abhishek Goliya, Pune (IN); Chandran Anjur Narasimhan, Milpitas, CA (US); Gurudutt Maiya Belur, San Carlos, CA (US); Vikas Kamath, Burlingame, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/384,737

(22) Filed: Jul. 24, 2021

(51) Int. Cl.
*H04L 67/10* (2022.01)
*H04L 12/66* (2006.01)
*H04L 12/46* (2006.01)

(52) U.S. Cl.
CPC .......... *H04L 67/10* (2013.01); *H04L 12/4633* (2013.01); *H04L 12/66* (2013.01)

(58) Field of Classification Search
CPC ...... H04L 67/10; H04L 12/4633; H04L 12/66
See application file for complete search history.

(56) References Cited

U.S. PATENT DOCUMENTS

| | | | |
|---|---|---|---|
| 5,652,751 A | 7/1997 | Sharony | |
| 5,909,553 A | 6/1999 | Campbell et al. | |

(Continued)

FOREIGN PATENT DOCUMENTS

| | | |
|---|---|---|
| CN | 1926809 A | 3/2007 |
| CN | 102577270 A | 7/2012 |

(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

(Continued)

*Primary Examiner* — Shean Tokuta
(74) *Attorney, Agent, or Firm* — Adeli LLP

(57) ABSTRACT

A software-defined wide area network (SD-WAN) environment that leverages network virtualization management deployment is provided. Edge security services managed by the network virtualization management deployment are made available in the SD-WAN environment. Cloud gateways forward SD-WAN traffic to managed service nodes to apply security services. Network traffic is encapsulated with corresponding metadata to ensure that services can be performed according to the desired policy. Point-to-point tunnels are established between cloud gateways and the managed service nodes to transport the metadata to the managed service nodes using an overlay logical network. Virtual network identifiers (VNIs) in the metadata are used by the managed service nodes to identify tenants/policies. A managed service node receiving a packet uses provider service routers (T0-SR) and tenant service routers (T1-SRs) based on the VNI to apply the prescribed services for the tenant, and the resulting traffic is returned to the cloud gateway that originated the traffic.

20 Claims, 21 Drawing Sheets

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,373,660 B1 | 5/2008 | Guichard et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 | 2/2012 | Ray | |
| 8,141,156 B1 | 3/2012 | Mao et al. | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,630,291 B2 | 1/2014 | Shaffer et al. | |
| 8,661,295 B1 | 2/2014 | Khanna et al. | |
| 8,724,456 B1 | 5/2014 | Hong et al. | |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,855,071 B1 * | 10/2014 | Sankaran | H04W 76/11 370/329 |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,135,037 B1 | 9/2015 | Petrescu-Prahova et al. | |
| 9,137,334 B2 | 9/2015 | Zhou | |
| 9,154,327 B1 | 10/2015 | Marino et al. | |
| 9,203,764 B2 | 12/2015 | Shirazipour et al. | |
| 9,306,949 B1 | 4/2016 | Richard et al. | |
| 9,323,561 B2 | 4/2016 | Ayala et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,563,423 B1 | 2/2017 | Pittman | |
| 9,602,389 B1 | 3/2017 | Maveli et al. | |
| 9,608,917 B1 | 3/2017 | Anderson et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,540 B1 | 11/2017 | Bahadur et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,832,205 B2 | 11/2017 | Santhi et al. | |
| 9,875,355 B1 | 1/2018 | Williams | |
| 9,906,401 B1 | 2/2018 | Rao | |
| 9,930,011 B1 | 3/2018 | Clemons, Jr. et al. | |
| 9,935,829 B1 | 4/2018 | Miller et al. | |
| 9,942,787 B1 | 4/2018 | Tillotson | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,187,289 B1 | 1/2019 | Chen et al. | |
| 10,200,264 B2 | 2/2019 | Menon et al. | |
| 10,229,017 B1 | 3/2019 | Zou et al. | |
| 10,237,123 B2 | 3/2019 | Dubey et al. | |
| 10,250,498 B1 | 4/2019 | Bales et al. | |
| 10,263,832 B1 | 4/2019 | Ghosh | |
| 10,320,664 B2 | 6/2019 | Nainar et al. | |
| 10,320,691 B1 | 6/2019 | Matthews et al. | |
| 10,326,830 B1 | 6/2019 | Singh | |
| 10,348,767 B1 | 7/2019 | Lee et al. | |
| 10,355,989 B1 | 7/2019 | Panchai et al. | |
| 10,425,382 B2 | 9/2019 | Mayya et al. | |
| 10,454,708 B2 | 10/2019 | Mibu | |
| 10,454,714 B2 | 10/2019 | Mayya et al. | |
| 10,461,993 B2 | 10/2019 | Turabi et al. | |
| 10,498,652 B2 | 12/2019 | Mayya et al. | |
| 10,511,546 B2 | 12/2019 | Singarayan et al. | |
| 10,523,539 B2 | 12/2019 | Mayya et al. | |
| 10,550,093 B2 | 2/2020 | Ojima et al. | |
| 10,554,538 B2 | 2/2020 | Spohn et al. | |
| 10,560,431 B1 | 2/2020 | Chen et al. | |
| 10,565,464 B2 | 2/2020 | Han et al. | |
| 10,567,519 B1 | 2/2020 | Mukhopadhyaya et al. | |
| 10,574,528 B2 | 2/2020 | Mayya et al. | |
| 10,594,516 B2 | 3/2020 | Cidon et al. | |
| 10,594,659 B2 | 3/2020 | El-Moussa et al. | |
| 10,608,844 B2 | 3/2020 | Cidon et al. | |
| 10,637,889 B2 | 4/2020 | Ermagan et al. | |
| 10,666,460 B2 | 5/2020 | Cidon et al. | |
| 10,686,625 B2 | 6/2020 | Cidon et al. | |
| 10,693,739 B1 | 6/2020 | Naseri et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,805,114 B2 | 10/2020 | Cidon et al. | |
| 10,805,272 B2 | 10/2020 | Mayya et al. | |
| 10,819,564 B2 | 10/2020 | Turabi et al. | |
| 10,826,775 B1 | 11/2020 | Moreno et al. | |
| 10,841,131 B2 | 11/2020 | Cidon et al. | |
| 10,911,374 B1 | 2/2021 | Kumar et al. | |
| 10,938,693 B2 | 3/2021 | Mayya et al. | |
| 10,951,529 B2 | 3/2021 | Duan et al. | |
| 10,958,479 B2 | 3/2021 | Cidon et al. | |
| 10,959,098 B2 | 3/2021 | Cidon et al. | |
| 10,992,558 B1 | 4/2021 | Silva et al. | |
| 10,992,568 B2 | 4/2021 | Michael et al. | |
| 10,999,100 B2 | 5/2021 | Cidon et al. | |
| 10,999,137 B2 | 5/2021 | Cidon et al. | |
| 10,999,165 B2 | 5/2021 | Cidon et al. | |
| 11,005,684 B2 | 5/2021 | Cidon | |
| 11,018,995 B2 | 5/2021 | Cidon et al. | |
| 11,044,190 B2 | 6/2021 | Ramaswamy et al. | |
| 11,050,588 B2 | 6/2021 | Mayya et al. | |

(56) References Cited

U.S. PATENT DOCUMENTS

| | | |
|---|---|---|
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 * | 12/2021 | Cidon .................. H04L 43/026 |
| 11,223,514 B2 | 1/2022 | Mayya et al. |
| 11,245,641 B2 | 2/2022 | Ramaswamy et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Masseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0300615 A1 | 11/2012 | Kempf et al. |
| 2012/0307659 A1 | 12/2012 | Yamada |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |

(56) References Cited

U.S. PATENT DOCUMENTS

| | | |
|---|---|---|
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1* | 10/2014 | Lynn, Jr. ............ H04L 43/0817 370/235 |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1* | 5/2015 | Mehta ................ H04L 45/22 370/237 |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Weres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0363221 A1 | 12/2015 | Terayama et al. |
| 2015/0363733 A1 | 12/2015 | Brown |
| 2015/0365323 A1* | 12/2015 | Duminuco ............ H04L 47/18 370/235 |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Masseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1* | 1/2017 | Hampel ................ H04W 28/10 |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1* | 2/2017 | Chanda ................ H04L 12/4633 |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |

(56) References Cited

U.S. PATENT DOCUMENTS

| | | |
|---|---|---|
| 2017/0064005 A1 | 3/2017 | Lee |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1* | 11/2017 | Masurekar ............... H04L 45/04 |
| 2017/0317969 A1* | 11/2017 | Masurekar ............... H04L 41/12 |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1* | 1/2018 | Chanda ............... H04L 63/0236 |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0334820 A1 | 10/2019 | Zhao |

(56) References Cited

U.S. PATENT DOCUMENTS

| | | |
|---|---|---|
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0169473 A1 | 5/2020 | Rimar et al. |
| 2020/0177503 A1 | 6/2020 | Hooda et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1* | 2/2021 | Mishra ............... H04L 12/4633 |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0105199 A1 | 4/2021 | C H et al. |
| 2021/0112034 A1 | 4/2021 | Sundararajan et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | C H et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1* | 10/2021 | Chandrashekhar ..... H04L 45/42 |
| 2021/0328835 A1 | 10/2021 | Mayya et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1* | 12/2021 | Sundararajan ...... H04L 41/0896 |
| 2021/0399978 A9 | 12/2021 | Michael et al. |
| 2021/0400113 A1* | 12/2021 | Markuze ............... H04L 69/326 |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |

FOREIGN PATENT DOCUMENTS

| | | | | |
|---|---|---|---|---|
| CN | 102811165 A | | 12/2012 | |
| CN | 104956329 A | | 9/2015 | |
| CN | 110047209 A | * | 11/2019 | ......... H04L 12/4633 |
| EP | 1912381 A1 | | 4/2008 | |
| EP | 3041178 A1 | | 7/2016 | |
| EP | 3509256 A1 | | 7/2019 | |
| JP | 2010233126 A | | 10/2010 | |
| JP | 2017059991 A | * | 3/2017 | |
| RU | 2574350 C2 | | 2/2016 | |
| WO | 03073701 A1 | | 9/2003 | |
| WO | 2007016834 A1 | | 2/2007 | |
| WO | 2012167184 A2 | | 12/2012 | |
| WO | 2016061546 A1 | | 4/2016 | |
| WO | 2017083975 A1 | | 5/2017 | |
| WO | 2019070611 A1 | | 4/2019 | |
| WO | 2019094522 A1 | | 5/2019 | |
| WO | 2020012491 A1 | | 1/2020 | |
| WO | 2020018704 A1 | | 1/2020 | |
| WO | 2020091777 A1 | | 5/2020 | |
| WO | 2020101922 A1 | | 5/2020 | |
| WO | 2020112345 A1 | | 6/2020 | |
| WO | 2021040934 A1 | | 3/2021 | |
| WO | 2021118717 A1 | | 6/2021 | |
| WO | 2021150465 A1 | | 7/2021 | |
| WO | 2022005607 A1 | | 1/2022 | |

OTHER PUBLICATIONS

Long, Feng, "Research and Application of Cloud Storage Technology in University Information Service," Chinese Excellent Masters' Theses Full-text Database, Mar. 2013, 72 pages, China Academic Journals Electronic Publishing House, China.

Mon-Published Commonly Owned International Patent Application PCT/US2021/065171, filed Dec. 24, 2021, 63 pages, VMware, Inc.

Non-Published Commonly Owned U.S. Appl. No. 17/562,890, filed Dec. 27, 2021, 36 pages, Nicira, Inc.

Non-Published Commonly Owned U.S. Appl. No. 17/572,583, filed Jan. 10, 2022, 33 pages, Nicira, Inc.

Noormohammadpour, Mohammad, et al., "DCRoute: Speeding up Inter-Datacenter Traffic Allocation while Guaranteeing Deadlines,"

(56) References Cited

OTHER PUBLICATIONS

2016 IEEE 23rd International Conference on High Performance Computing (HiPC), Dec. 19-22, 2016, 9 pages, IEEE, Hyderabad, India.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.

Huang, Cancan, et al., "Modification of Q.SD-WAN," Rapporteur Group Meeting--Doc, Study Period 2017-2020, Q4/11-DOC1 (190410), Study Group 11, Apr. 10, 2019, 19 pages, International Telecommunication Union, Geneva, Switzerland.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/072,764, filed Oct. 16, 2020, 33 pages, VMware, Inc.

Non-Published Commonly Owned U.S. Patent Application 17/072,//4 (F919.02), filed Oct. 16, 2020, 34 pages, VMware, Inc.

Non-Published Commonly Owned U.S. Appl. No. 17/085,893, filed Oct. 30, 2020, 34 pages, VMware, Inc.

Non-Published Commonly Owned U.S. Appl. No. 17/085,916, filed Oct. 30, 2020, 35 pages, VMware, Inc.

Non-Published Commonly Owned U.S. Appl. No. 17/103,614, filed Nov. 24, 2020, 38 pages, VMware, Inc.

Non-Published Commonly Owned U.S. Appl. No. 17/143,092, filed Jan. 6, 2021, 42 pages, VMware, Inc.

Non-Published Commonly Owned U.S. Appl. No. 17/143,094, filed Jan. 6, 2021, 42 pages, VMware, Inc.

Non-Published Commonly Owned U.S. Appl. No. 17/194,038, filed Mar. 5, 2021, 35 pages, VMware, Inc.

Non-Published Commonly Owned U.S. Appl. No. 17/227,016, filed Apr. 9, 2021, 37 pages, VMware, Inc.

Non-Published Commonly Owned U.S. Appl. No. 17/227,044, filed Apr. 9, 2021, 37 pages, VMware, Inc.

Non-Published Commonly Owned U.S. Appl. No. 17/240,890, filed Apr. 26, 2021, 325 pages, VMware, Inc.

Non-Published Commonly Owned U.S. Appl. No. 17/240,906, filed Apr. 26, 2021, 18 pages, VMware, Inc.

Non-Published Commonly Owned U.S. Appl. No. 17/351,327, filed Jun. 18, 2021, 48 pages, VMware, Inc.

Non-Published Commonly Owned U.S. Appl. No. 17/351,333, filed Jun. 18, 2021, 47 pages, VMware, Inc.

Non-Published Commonly Owned U.S. Appl. No. 17/351,340, filed Jun. 18, 2021, 48 pages, VMware, Inc.

Non-Published Commonly Owned U.S. Appl. No. 17/351,342, filed Jun. 18, 2021, 47 pages, VMware, Inc.

Non-Published Commonly Owned U.S. Appl. No. 17/351,345, filed Jun. 18, 2021, 48 pages, VMware, Inc.

Non-Published Commonly Owned U.S. Appl. No. 17/361,292, filed Jun. 28, 2021, 35 pages, Micira, Inc.

Non-Published Commonly Owned Related U.S. Appl. No. 17/384,735 with similar specification, filed Jul. 24, 2021, 62 pages, VMware, Inc.

Non-Published Commonly Owned Related U.S. Appl. No. 17/384,736 with similar specification, filed Jul. 24, 2021, 63 pages, VMware, Inc.

Non-Published Commonly Owned Related U.S. Appl. No. 17/384,738 with similar specification, filed Jul. 24, 2021, 62 pages, VMware, Inc.

Non-Published Commonly Owned U.S. Appl. No. 17/467,378, filed Sep. 6, 2021, 157 pages, VMware, Inc.

Non-Published Commonly Owned U.S. Appl. No. 17/474,034, filed Sep. 13, 2021, 349 pages, VMware, Inc.

Non-Published Commonly Owned U.S. Appl. No. 15/803,964, filed Nov. 6, 2017, 15 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Webb, Kevin C., et al., "Blender: Upgrading Tenant-Based Data Center Networking," 2014 ACM/IEEE Symposium an Architectures for Networking and Communications Systems (ANCS), Oct. 20-21, 2014, 11 pages, IEEE, Marina del Rey, CA, USA.

Xie, Junheng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Guo, Xiangyi, et al., (U.S. Appl. No. 62/925,193), filed Oct. 23, 2019, 26 pages.

Non-Published Commonly Owned U.S. Appl. No. 17/542,413, filed Dec. 4, 2021, 173 pages, VMware, Inc.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

PCT International Search Report and Written Opinion of Commonly Owned International Patent Application PCT/US2021/065171, dated Apr. 20, 2022, 15 pages, International Searching Authority (EPO).

\* cited by examiner

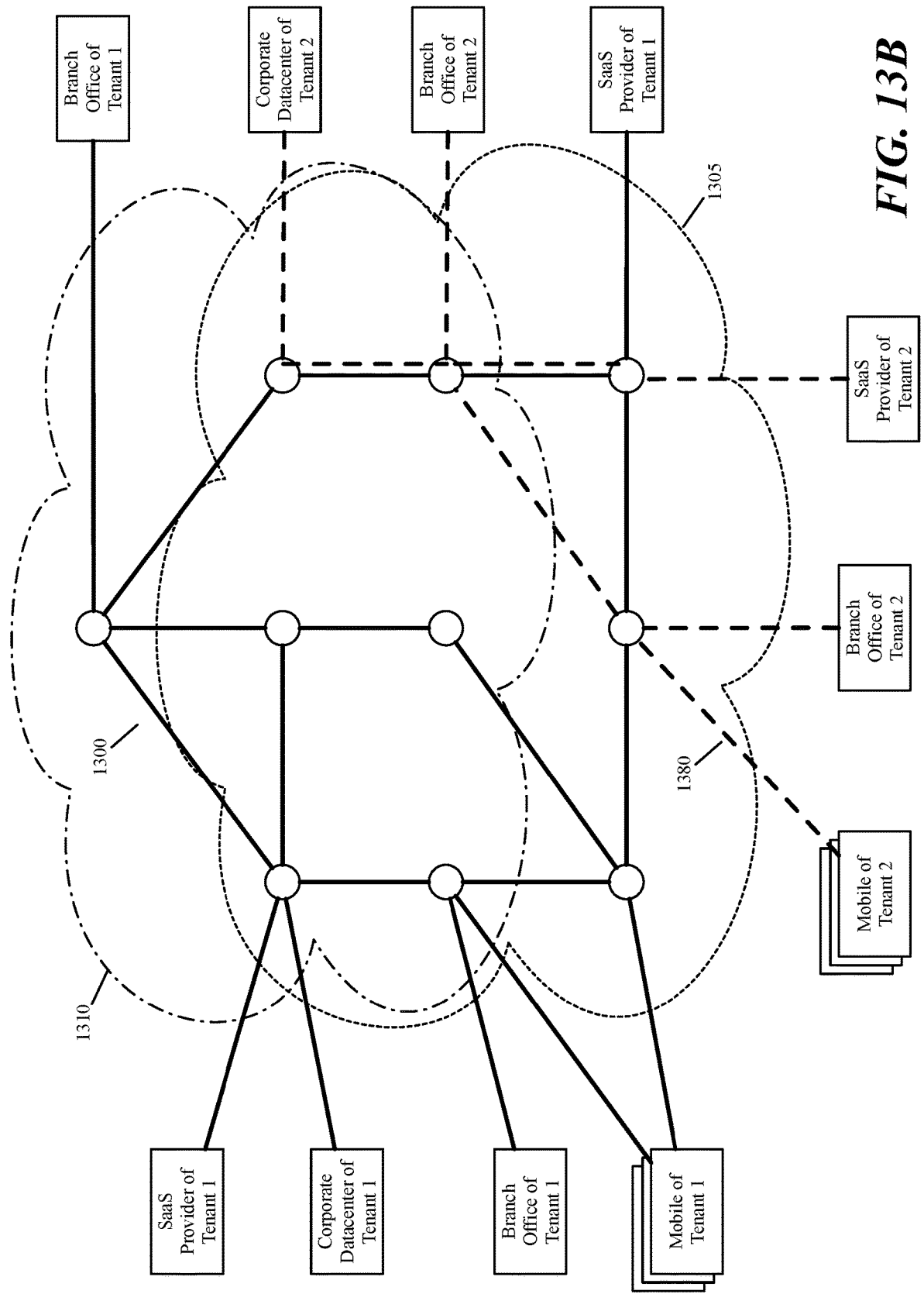

HIGH AVAILABILITY SOLUTIONS FOR A SECURE ACCESS SERVICE EDGE APPLICATION

BACKGROUND

Software-Defined Wide Area Network (SD-WAN) is a technology that simplifies wide area networking through centralized control of the networking hardware or software that directs traffic across a wide area network (WAN). It also allows organizations to combine or replace private WAN connections with Internet, broadband, Long Term Evolution (LTE), and/or 5G connections. The central controller sets policies, prioritizes, optimizes, and routes WAN traffic, and selects the best link and path dynamically for optimum performance. SD-WAN vendors may offer security functions with their SD-WAN virtual or physical appliances, which are typically deployed at datacenters or branch offices.

Secure Access Service Edge (SASE) is a security framework that provides WAN security as a cloud service to the source of connection (e.g., user, device, branch office, IoT devices, edge computing locations) rather than an enterprise datacenter. Security is based on identity, real-time context, and enterprise security and compliance policies. An identity may be attached to anything from a person/user to a device, branch office, cloud service, application, IoT system, or an edge computing location. Typically, SASE incorporates SD-WAN as part of a cloud service that also delivers mobile access and a full security stack delivered from a local point of presence or PoP (e.g., routers, switches, servers, and other devices necessary for traffic to cross over networks.) SASE converges the connectivity and security stacks and moves them to the network edge. A security stack that once resided in appliances in the datacenter or in branch locations on the perimeter is installed in the cloud as a converged, integrated stack, which can also be referred to as a SASE stack.

SUMMARY

Some embodiments provide a cloud native solution or software-defined wide area network (SD-WAN) environment that hides network virtualization management user interface components. Specifically, a SD-WAN orchestrator performs or drives network virtualization management operations such as provisioning tenants, configuring network services, and supporting operations in the SD-WAN environment. The network virtualization management deployment is partitioned among tenants using constructs such as tenant service routers (T1-SRs) and provider service routers (T0-SRs) so that all traffic can be policed appropriately.

In some embodiments, edge security services such as L4-7 firewalls, URL filtering, TLS proxy, IDS/IPS, etc., that are managed by the network virtualization management deployment are made available in the SD-WAN environment so security services can be applied to classify and police user traffic in the SD-WAN. In some embodiments, cloud gateways forward SD-WAN traffic to managed service nodes to apply security services. Network traffic is encapsulated with corresponding metadata to ensure that services can be performed according to the desired policy. Point-to-point tunnels are established between cloud gateways and the managed service nodes to transport the metadata to the managed service nodes using a particular overlay logical network. Virtual network identifiers (VNIs) in the transported metadata are used by the managed service nodes to identify tenants/policies. A managed service node receiving a packet uses the appropriate tenant-level service routers (or T1-SRs) based on the VNI to apply the prescribed services for the tenant, and the resulting traffic is returned to the cloud gateway that originated the traffic.

In some embodiments, the network virtualization management deployment provides stateful active-active (A/A) high availability services for SASE to protect against hardware failures in a PoP. Specifically, a pair of managed service nodes in a same PoP are configured to jointly provide stateful network security services in A/A configuration. When one managed service node in the pair fails, the other managed service node takes over by assuming the tunnel endpoint and the service states of the failed managed service node.

In some embodiments, the T1-SRs and T0-SRs have uplink and downlink connections with an external network. In some embodiments, a managed service node implementing a T0-SR and one or more T1-SRs performs two layers of address translation on packet traffic going to the external network. The two layers of address translation is for ensuring that the response traffic from the external network can successfully arrive back at the managed service node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 13A-C illustrate examples of virtual networks.

DETAILED DESCRIPTION

Figure 1A:
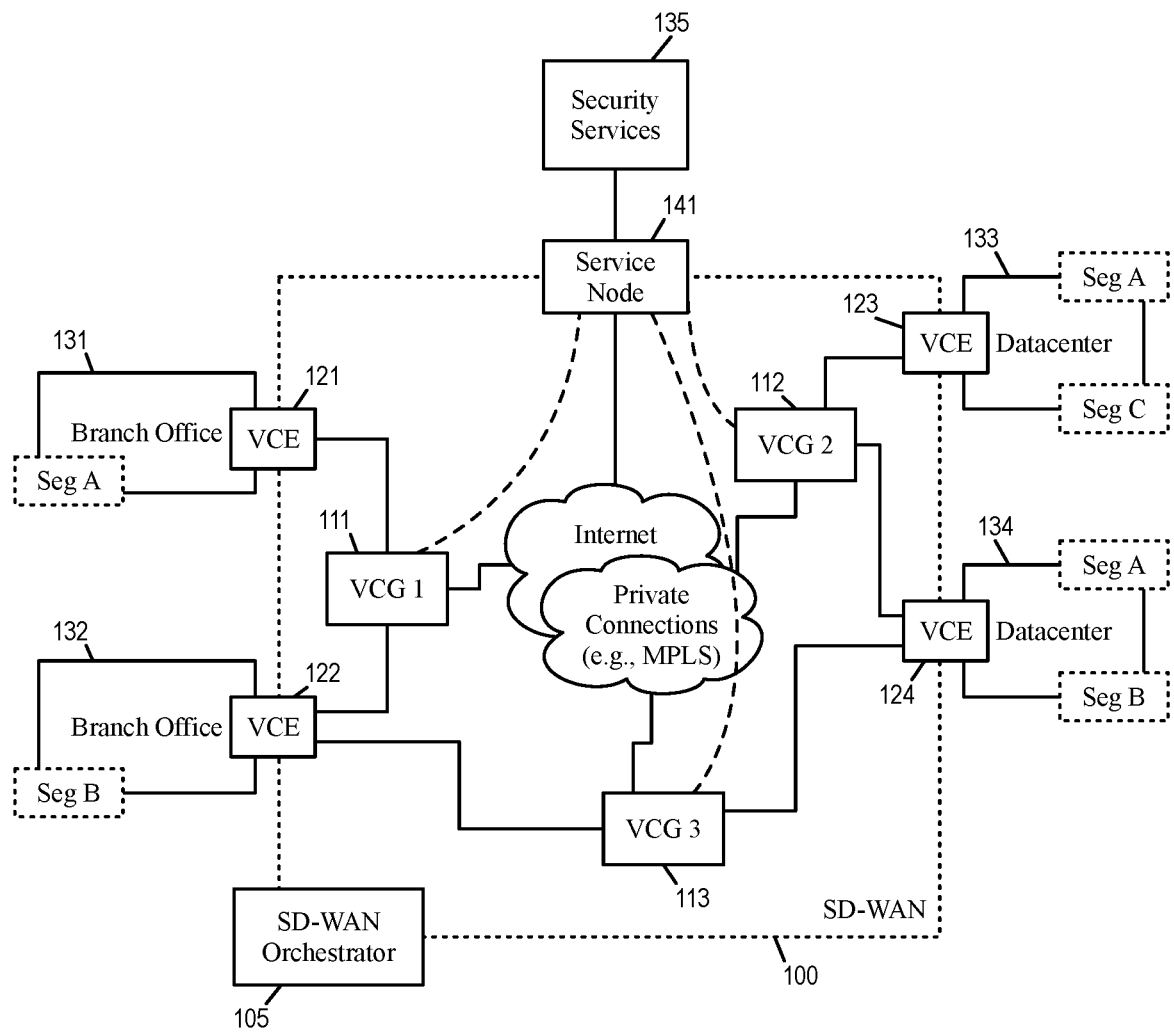
FIGS. 1a-b conceptually illustrate a SD-WAN environment with network virtualization management in a SASE context.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Network virtualization management (e.g., VMware NSX®) is normally deployed on premises, points-of-presence (PoPs), or in a virtual private cloud environment where the same administrative entity operates the deployment. However, in secure access service edge (SASE) use cases, a single network virtualization management deployment is expected to be shared by multiple customers/tenants and is expected to be cloud-based. Typically, users are not concerned with the location of the various network virtualization management components, which are consumable as a homogeneous entity regardless of their physical placement.

Some embodiments provide a cloud native solution or SD-WAN environment that hides network virtualization management user interface components (e.g., APIs). Specifically, a SD-WAN orchestrator (e.g., VeloCloud Orchestrator® or VCO) performs or drives network virtualization management operations such as provisioning tenants, configuring network services, and supporting operations in the SD-WAN environment. The network virtualization management deployment is partitioned among tenants using constructs such as tenant service routers (T1-SRs) and provider service routers (T0-SRs) so that all traffic can be policed appropriately.

In some embodiments, edge security services such as L4-7 firewalls, URL filtering, TLS proxy, IDS/IPS, etc., that are managed by the network virtualization management deployment are made available in the SD-WAN environment so security services can be applied to classify and police user traffic in the SD-WAN. In some embodiments, cloud gateways (also referred to as SD-WAN gateways, e.g., VeloCloud® Gateways, or VCGs) forward SD-WAN traffic to managed service nodes (that are managed by network virtualization management) to apply security services. Network traffic is encapsulated with corresponding metadata to ensure that services can be performed according to the desired policy. Point-to-point tunnels are established between cloud gateways and the managed service nodes to transport the metadata to the managed service nodes using a particular overlay logical network (e.g., VMware Geneve®). Virtual network identifiers (VNIs) in the transported metadata are used by the managed service nodes to identify tenants/policies. A managed service node receiving a packet (or other types of data messages) uses appropriate tenant-level service routers (or T1-SRs) based on the VNI to apply the prescribed services for the tenant, and the resulting traffic is returned to the cloud gateway that originated the traffic. This operation is also referred to as data plane stitching.

Figure 1B:
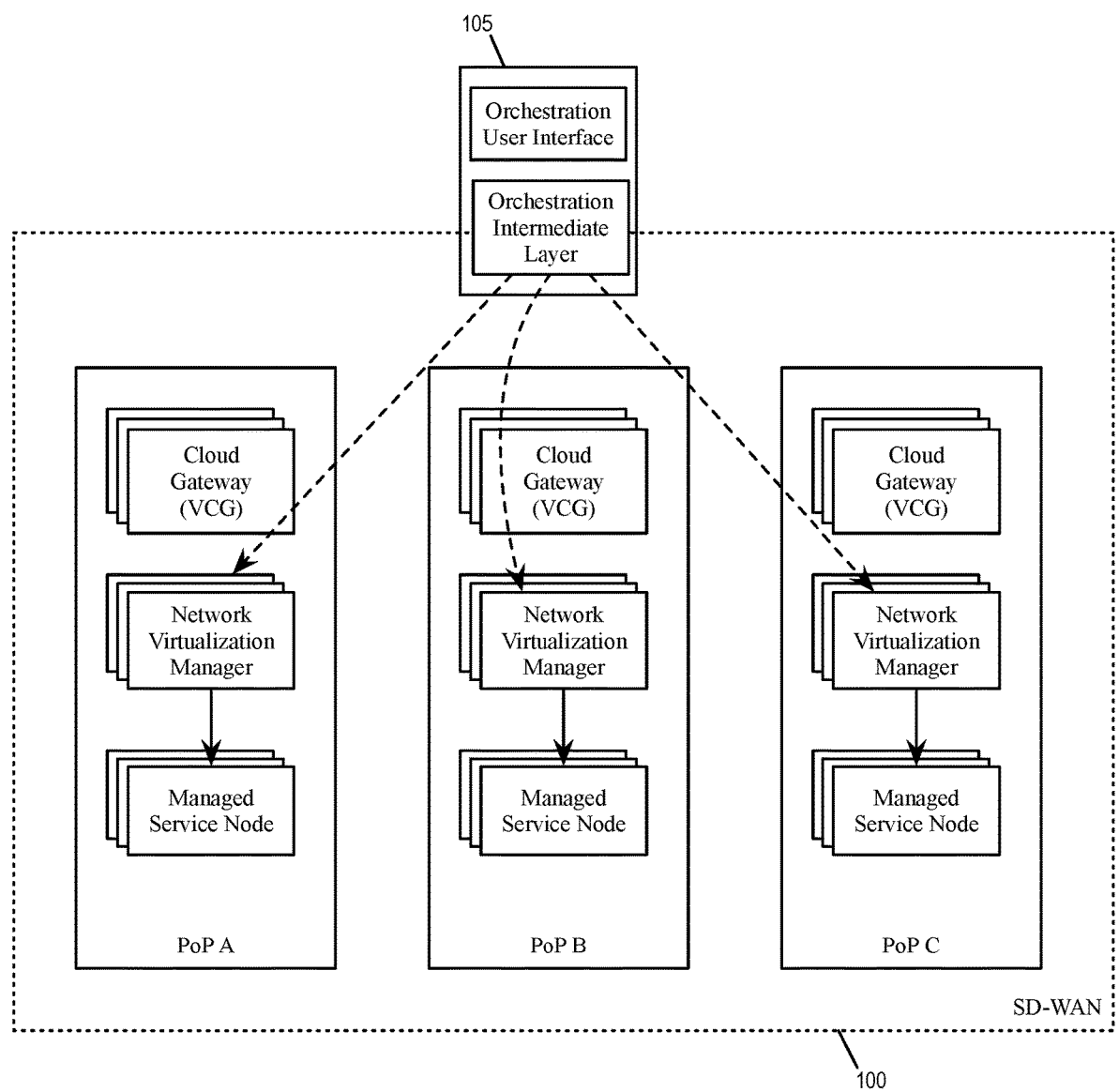

FIGS. 1a-b conceptually illustrate a SD-WAN environment with network virtualization management in a SASE context. Specifically, a SD-WAN orchestrator 105 defines a SD-WAN environment 100 across various public and private networks by configuring various network components in various physical locations to be components of the SD-WAN. The SD-WAN orchestrator 105 also leverages network virtualization management deployment to provision and manage service nodes to provide security services to user applications of the SD-WAN environment 100.

As illustrated in FIG. 1a, the SD-WAN environment 100 is overlaid over underlying physical network infrastructure, which may include the Internet and various private connections. The SD-WAN environment 100 is managed by a SD-WAN orchestrator 105 (or "the orchestrator"), which provisions and configures various components of the SD-WAN. These SD-WAN components are physically hosted by various points-of-presence (PoPs) at various physical locations of the underlying physical network infrastructure of the SD-WAN 100. These SD-WAN components brings together networks and computing resources in disparate physical locations (datacenters, branch offices, etc.) to form a virtual network that is the SD-WAN 100.

The SD-WAN orchestrator 105 configures and/or provisions SD-WAN components such as cloud gateways 111-113 (also referred to as SD-WAN gateways, e.g., VeloCloud Gateways® or VCGs) and cloud edges 121-124 (also referred to as SD-WAN edges, e.g., VeloCloud Edges®, or VCEs.) The cloud gateways (VCGs) are hosted in PoPs in the cloud, and these PoPs may be physically located around the world. Different traffic streams in the SD-WAN are sent to the cloud gateways and they route the traffic to their destinations, such as cloud datacenters or corporate datacenters.

The cloud gateways perform optimizations between themselves and the cloud edges. The cloud edges (VCEs) can be configured to use cloud gateways which are physically nearby for better performance. Cloud edges are devices placed in the branch offices and datacenters. It can terminate multiple WAN connections and steer traffic over them for the best performance and reliability. A cloud edge device may provide support for various routing protocols such as Open Shortest Path First (OSPF) and Border Gateway Protocol (BGP), along with static routing, with an IP service-level agreement (SLA). It can also perform functionalities of legacy routers.

As illustrated, the cloud gateways 111-113 are physically located in different parts of the underlying physical network to route network traffic between various datacenters, branch offices, and service providers that participate in the SD-WAN 100. The cloud edge 121 is configured to extend the SD-WAN 100 into a branch office 131, the cloud edge 122 is configured to extend the SD-WAN 100 into a branch office 132, the cloud edge 123 is configured to extend the SD-WAN 100 into a datacenter 133, and the cloud edge 124 is configured to extend the SD-WAN 100 into a datacenter 134. Each of the cloud edges 121-124 use one or more physically proximate cloud gateways 111-113 to route traffic through the SD-WAN 100. In the example of FIG. 1a, the cloud edge 121 uses the cloud gateway 111, the cloud edge 122 uses the cloud gateways 111 and 113, the cloud edge 123 uses the cloud gateway 112, and the cloud edge 124 uses the cloud gateways 112 and 113.

In some embodiments, the orchestrater 105 is part of a cloud-hosted centralized management system (e.g., VMware SD-WAN Orchestrator®, or VCO), which may be hosted by a management cluster that exists either within a same PoP or across multiple different PoPs. In some embodiments, the cloud edges 121-124 connect to the SD-WAN orchestrator 105 and download their configurations from it. The SD-WAN orchestrator 105 also provide visibility into the performance of the various SD-WAN components and aid in their troubleshooting. In some embodiments, the network virtualization management software exposes a set of APIs that can be used by the SD-WAN orchestrator 105 to drive the network virtualization management deployment to e.g., control the managed service node 141, define security policies, and drive configuration of security services in the managed service nodes.

In the SD-WAN environment 100, a managed service node 141 makes security services from security service provider 135 available to tenants or customers of the SD-WAN 100. A tenant may be a customer of the SD-WAN provider or a subdivision of a customer (e.g. a business unit, a site, etc.). More generally, boundaries of tenant segments are defined along different security postures. In some embodiments, managed service nodes are for providing security and gateway services that cannot be run on distributed routers. The managed service nodes may apply security services on E-W traffic from other network entities (e.g., cloud gateways) of the same PoP. These managed service nodes may also perform edge services such as N-S routing (traffic to and from external network), load balancing, DHCP, VPN, NAT, etc. In some embodiments, the managed service nodes are running as a virtual machine (VM) or data compute node (DCN) at a host machine running virtualization software or a hypervisor such as VMware ESX®. These managed service nodes are controlled by the network virtualization management deployment (e.g., VMware NSX-T® Edge). The orchestrator 105 communicates with network virtualization management deployment to configure the managed service node 141.

FIG. 1b conceptually illustrates the SD-WAN orchestrator and the service nodes being managed by the network virtualization management deployment. As illustrated, network virtualization management software (or network virtualization managers) is deployed at various points of presence (PoPs) throughout the underlying physical network of the SD-WAN environment 100, including PoP A, PoP B, and PoP C. Each PoP (e.g., a datacenter) includes clusters of computing devices that implement network virtualization management, service nodes, and cloud gateways. The SD-WAN orchestrator 105 of the SD-WAN 100 communicates with the network virtualization managers deployed in the various PoPs to coordinate their operations. The orchestrator 105 may use APIs provided by the network virtualization management software to coordinate with the network virtualization managers. The network virtualization manager of each PoP in turn controls and manages host machines and network appliances (e.g., service nodes) of that PoP and any network constructs therein. For example, the orchestrator 105 may communicate with a network virtualization manager to configure and manage a service node of the same PoP (e.g., the managed service node 141) to implement provider-level (Tier 0 or T0) routers and tenant-level (Tier 1 or T1) routers. Each service node implemented in a PoP is also configured to receive packet traffic from cloud gateways (VCGs) at a same PoP.

In some embodiments, the orchestration scheme of the SD-WAN 100 has multiple tiers. A first tier of the orchestration scheme handles user facing interactions (labeled as "orchestration user interface"). A second, intermediate tier (labeled as "orchestration intermediate layer") handles the orchestrator's interactions with each PoP, including communicating with network virtualization management (e.g., NSX-T®), virtualization software (e.g., ESX®), and server management (e.g., vCenter®). The intermediate tier may also handle any rules translation between different domains, etc.

A SD-WAN may serve multiple different tenants. In some embodiments, the SD-WAN is partitioned into tenant segments (also referred to as velo segments or SD-WAN segments), each tenant segment is for conducting the traffic of a tenant. In the example, the SD-WAN 100 has three tenant segments A, B, and C. Each tenant segment may span across multiple datacenters and/or branch offices. In the example of FIG. 1a, the branch office 131 has network traffic for tenant segment A, the branch office 132 has network traffic for tenant segment B, the datacenter 133 has traffic for tenant segments A and C, and the datacenter 134 has traffic for tenant segments A and B. Each customer or tenant may have one or several tenant segments. The traffic of different tenant segments does not mix with each other. In some embodiments, within each tenant segment, the SD-WAN applies a set of security policies (e.g., firewall rules, intrusion detection rules, etc.) specific to the tenant segment (or a VNI associated with the tenant segment).

In some embodiments, the network virtualization management deployment provides network entities to apply the different sets of security policies to packet traffic of different tenant segments. In some embodiments, dedicated tenant-level (T1) entities are defined to apply security policies to individual tenant segments. In some embodiments, for each tenant segment, one or more dedicated tenant-level service routers (T1-SR) are used as processing pipelines to apply the policies to the packets of the tenant segment.

As mentioned, in the SD-WAN 100, traffic from datacenters and branch offices is sent to cloud edges and cloud gateways. In some embodiments, the cloud gateways send the traffic it receives from cloud edges to the policy-applying T1-SRs. In some embodiments, these T1-SRs are implemented or provisioned in service nodes (e.g., the managed service node 141) managed by the network virtualization management (deployed in PoPs). In some embodiments, the managed service node uses metadata embedded or encapsulated in the packet traffic to identify the tenant segment that the traffic belongs to, or the policies to be applied, and hence which T1-SR should be used to perform the security services. In some embodiments, the managed service node sends the T1-SR-processed packet traffic back to where it originated (e.g., the cloud gateway that sent the packet traffic to the managed service node). In some embodiments, the managed service node forwards the processed packet traffic directly to a destination without going back to the cloud gateway.

Figure 2:
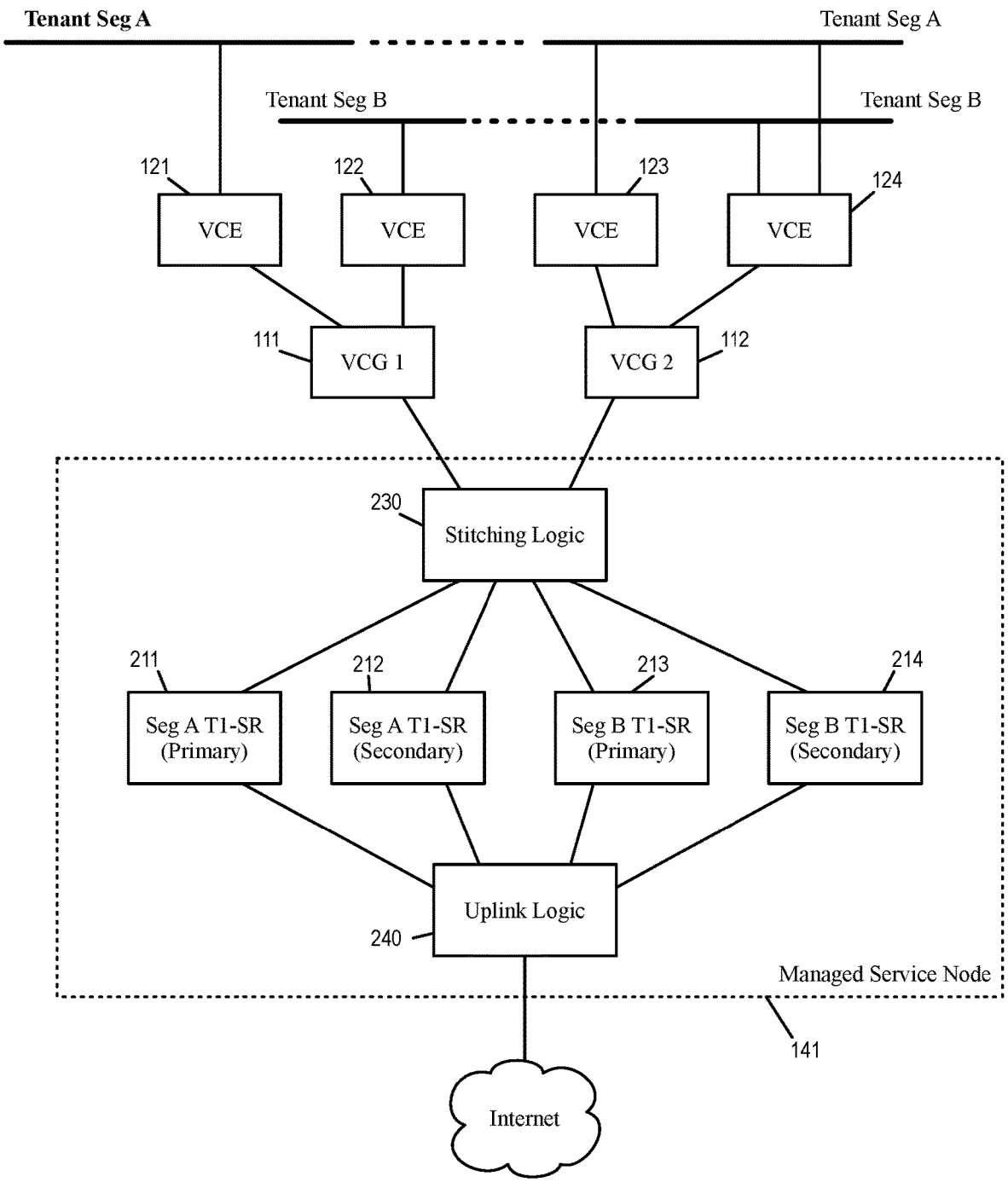
FIG. 2 conceptually illustrates T1-SRs in a managed service node being used to apply security policies for different tenant segments.

FIG. 2 conceptually illustrates T1-SRs in a managed service node being used to apply security policies for different tenant segments. As illustrated, the cloud edges 121, 123, and 124 receive traffic from tenant segment A, and the cloud edges 122 and 124 receive traffic from tenant segment B. The cloud gateway 111 receives traffic from cloud edges 121 and 122. The cloud gateway 112 receives traffic from cloud edges 123 and 124. The cloud gateways 111 and 112 are configured to send traffic to the managed service node 141. Within the managed service node 141, T1-SRs 211 and 212 are provisioned to process traffic of tenant segment A, and T1-SRs 213 and 214 are provisioned to process traffic of tenant segment B.

In some embodiments, each T1-SR serves a single VNI, which is mapped to a single tenant segment or a set of security policies. In some embodiments, multiple T1-SRs may serve traffic for a same VNI (or tenant segment). For example, the SD-WAN orchestrator 105 may provision a single T1-SR to serve traffic for a portion of a tenant segment. The SD-WAN orchestrator 105 may provision a T1-SR to handle traffic of a tenant segment from a single cloud edge. The SD-WAN orchestrator 105 may provision a first T1-SR to apply a first security policy and a second T1-SR to apply a second security policy for a particular tenant segment. In some embodiments, when the capacity for a single tenant segment or customer exceeds the throughput of an edge node or an edge node pair, the orchestrator 105 may provision additional managed service nodes or T1-SRs to serve traffic for the same VNI.

In some embodiments, the managed service node 141 provides custom stitching logic 230 between the cloud gateways and the T1-SRs, as well as uplink logic 240 between T1-SRs and the Internet. In some embodiments, the stitching logic 230 is for encapsulation and decapsulation of packets as well as demultiplexing traffic, and the uplink logic 240 is for applying routing and source network address translation (SNAT) on traffic going into the Internet. In some embodiments, the SD-WAN orchestrator 105 provisions a provider-level (T0) service router (T0-SR) shared by different tenants in the managed service node 141 to implement the function of the stitching logic 230 and the uplink logic 240. In some embodiments, each packet arriving at the managed service node 141 is encapsulated with metadata. The T0-SR in turn decapsulates the packet and uses the metadata to demultiplex the packet (e.g., to determine which of the T1-SRs 211-214 should the packet be sent based on VNI or application ID in the metadata).

In some embodiments, the cloud gateways send traffic to the managed service nodes (such as the managed service node 141) through overlay tunnels (such as Geneve®) to tunnel endpoints (TEPs) that correspond to the managed service nodes. In some embodiments, each managed service node is addressable by a unique TEP. In some embodiments, one managed service node is addressable by multiple TEPs, such as when one managed service node takes over for another managed service node that has failed in a high availability implementation.

Figure 3:
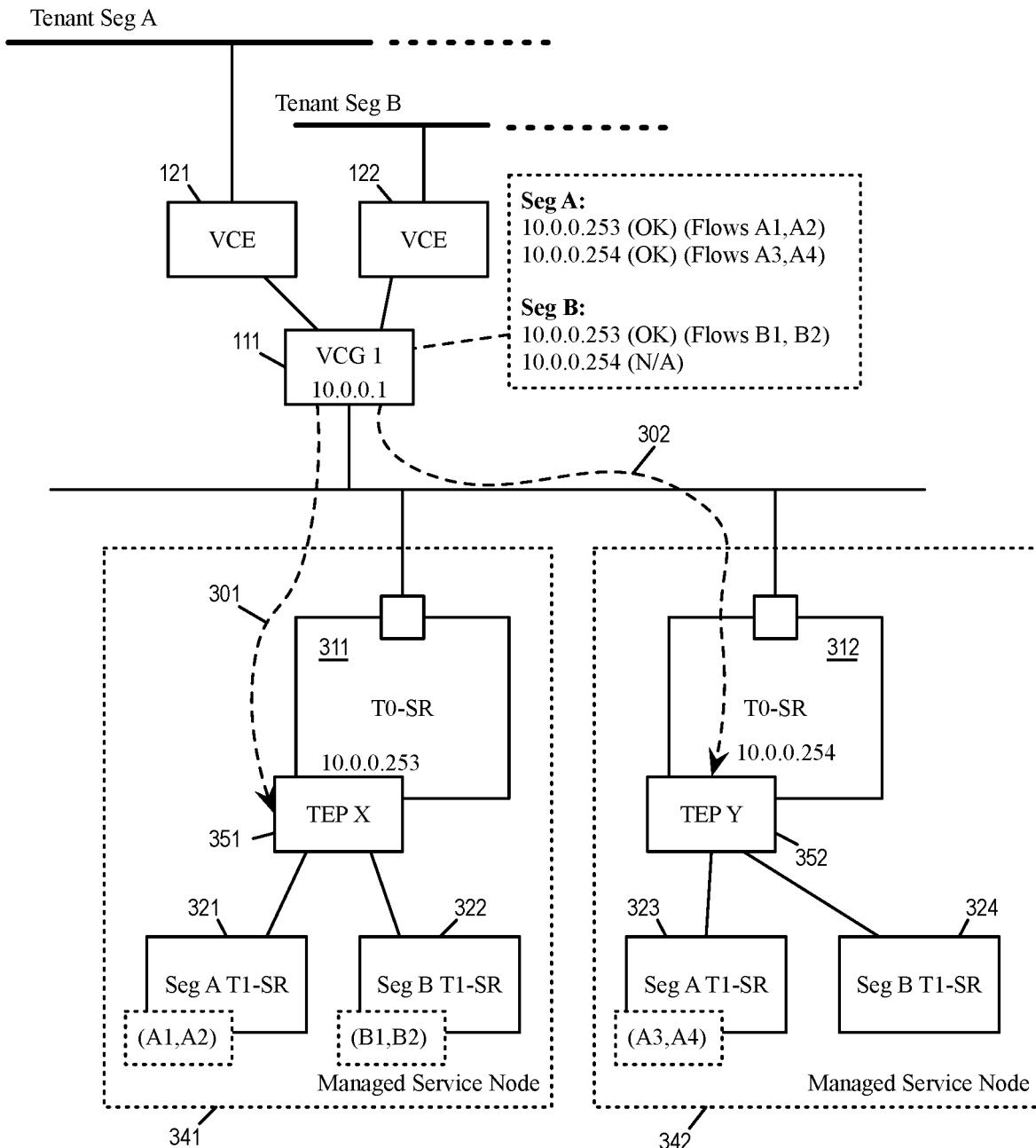
FIG. 3 conceptually illustrates a cloud gateway using overlay tunnels to send to managed service nodes for security services.

FIG. 3 conceptually illustrates a cloud gateway using overlay tunnels to send packet traffic to managed service nodes for security services. The managed service nodes are configured to serve as tunnel endpoints (TEPs) by the network manager to receive tunneled traffic from cloud gateways. As illustrated, the cloud gateway 111 has an outer IP address 10.0.0.1. A managed edged node 341 has an outer IP address 10.0.0.253. Another managed service node 342 has an IP address 10.0.0.254. (The managed service nodes 341 and 342 are similar to the managed service node 141).

The cloud gateway 111 uses the outer IP addresses to send packet traffic to the managed service node 341 and the managed service node 342. The packet traffic to the managed node 341 is encapsulated traffic in an overlay tunnel 301 destined for a TEP 351 (TEP X), and the packet traffic to the managed node 342 is encapsulated traffic in an overlay tunnel 302 destined for a TEP 352 (TEP Y). The managed service node 341 has a T0-SR 311 that decapsulates the incoming packet traffic to see if the traffic is tunneled towards the TEP 351. The tunnel traffic at the TEP 351 is further distributed to either T1-SR 321 for tenant segment A or T1-SR 322 for tenant segment B. Likewise, the tunnel traffic at the TEP 352 will then be further distributed to either T1-SR 323 for tenant segment A or T1-SR 324 for tenant segment B. The tunnel traffic is isolated based on different VNIs.

In some embodiments, cloud gateways maintain flows that are pinned to tunnel endpoints. Inner/user IP addresses (and flow 5-tuples in general) are unique within a VNI. In some embodiments, a cloud gateway is configured to have a list of tunnel endpoints it can direct traffic to for each tenant segment. In the example of FIG. 3, the cloud gateway 111 has a list of tunnel endpoints for tenant segment A that includes at least 10.0.0.253 (TEP X) and 10.0.0.254 (TEP Y). These tunnel endpoints are allocated by a local network manager on request from a user interface (e.g., API used by the SD-WAN orchestrator 105.) In some embodiments, for each tenant segment, a cloud gateway is configured with (i) the VNI of the tenant segment, and (ii) a list of tunnel endpoints for the tenant segment. Each element in the list of tunnel endpoints specifies an IP address for a tunnel endpoint, a destination MAC address for an inner Ethernet header to be used for the tunnel endpoint, and a state of the tunnel endpoint (e.g., viable or non-viable). In some embodiments, the SD-WAN orchestrator 105 constructs the list of tunnel endpoints for a tenant segment in the cloud gateway as it provisions T1-SRs for the tenant segment.

Figure 4:
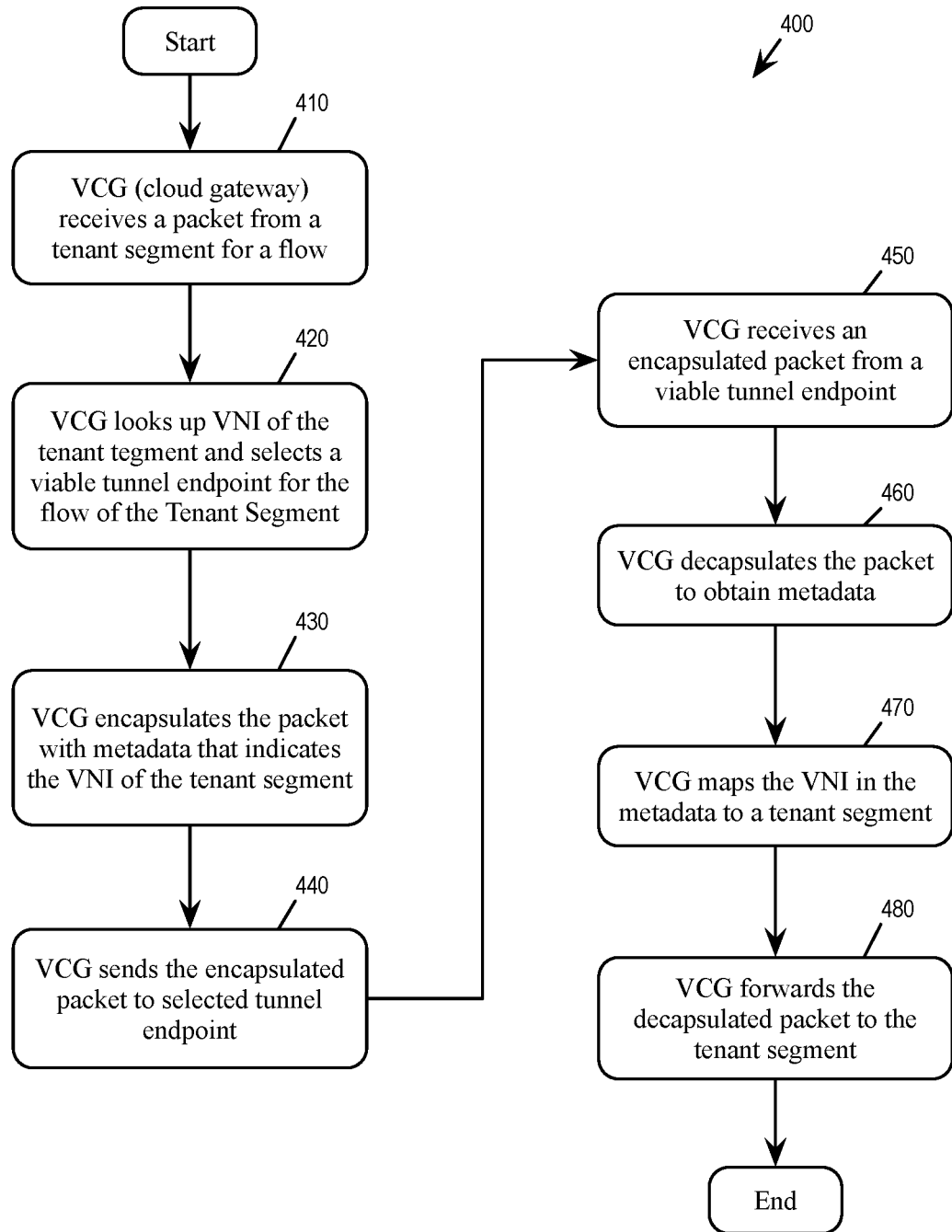
FIG. 4 conceptually illustrates a process for sending packet traffic to a managed service node for applying security policies or services.

FIG. 4 conceptually illustrates a process 400 for sending packet traffic to a managed service node for applying security policies or services. In some embodiments, a cloud gateway performs the process 400 when it transmits a packet to a managed node for applying security policies and when it receives a return packet from the managed node. In some embodiments, one or more processing units (e.g., processor) of a computing device implementing a cloud gateway (e.g., the cloud gateway 111) performs the process 400 by executing instructions stored in a computer-readable medium.

The process 400 starts when the cloud gateway receives (at 410) a packet from a tenant segment to have security service applied. The cloud gateway looks up (at 420) the VNI of the tenant segment and selects a viable tunnel endpoint for that tenant segment (if multiple endpoints are viable, the cloud gateway may load-balance among the endpoints, but packets of a same flow must remain pinned to the endpoint for the flow's duration.) The cloud gateway encapsulates (at 430) the packet with metadata that includes the VNI of the tenant segment. The cloud gateway then sends (at 440) the encapsulated packet to the selected tunnel endpoint. The packet may have a source MAC address unique to the cloud gateway and a destination MAC that is specified for the selected (viable) tunnel endpoint. In some embodiments, the operations 410-440 are performed by a transmit path of the cloud gateway.

The cloud gateway receives (at 450) an encapsulated packet from a viable tunnel endpoint. In some embodiments, the cloud gateway is configured to accept any packet coming from any tunnel endpoint to its destination port. The cloud gateway then decapsulates (at 460) the received packet to obtain its metadata. The cloud gateway maps (at 470) the VNI in the metadata to a tenant segment in the SD-WAN and forwards (at 480) the decapsulated packet to the tenant segment. The cloud gateway may verify whether the VNI is allowed to reach the tunnel endpoint from which the packet is received. The cloud gateway may also take further actions on the packet (e.g., forward, abort) based on the VNI/tunnel endpoint verification and/or the content in the packet, which includes the result of the security services. The process 400 then ends.

A cloud gateway is a stateful device that doesn't offer any security services but determines which packets belong to which flow as it stores contexts associated with that flow. The cloud gateway keeps a table of tuples for defining flows, so every subsequent packet of the flow would be sent out to the same tunnel endpoint and same T1-SR. The cloud gateway looks up which policy that it needs to apply and whether it involves network virtualization management. The cloud gateway also knows which T0-SRs and T1-SRs are available to process the traffic. This information is communicated from the orchestrator, so the cloud gateway has an idea as to the number of T0 and T1 entities, which entities are active, which entities are dead, and which entities are available for a specific VNI/tenant segment. In some embodiments, when the cloud gateway sees the first packet of a flow, the cloud gateway load balances across all the possible T1-SRs for that tenant segment. At that point, the cloud gateway generates the encapsulation and sends the packet to the T0-SR or managed service node.

Figure 5:
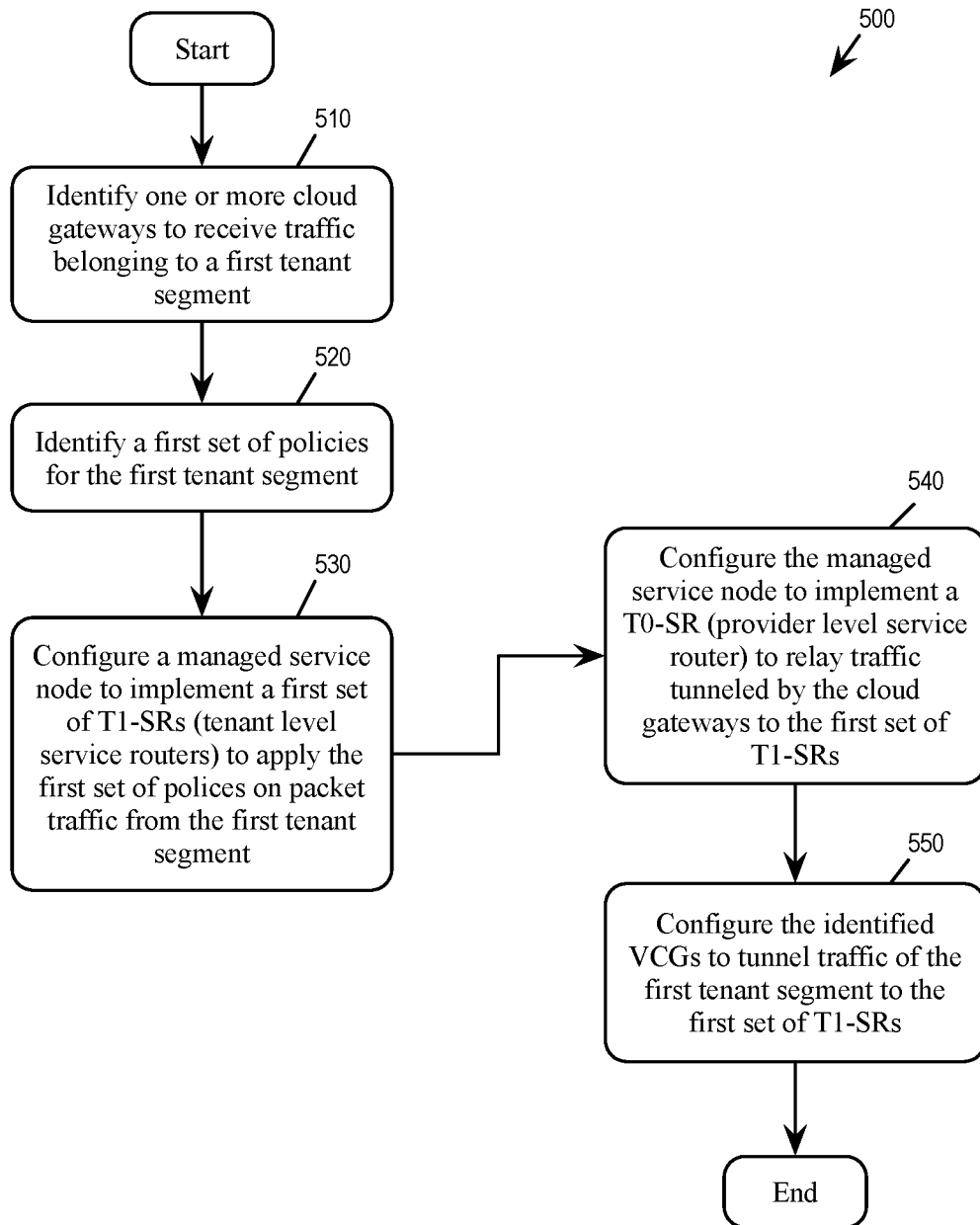
FIG. 5 conceptually illustrates a process for configuring cloud gateways and service nodes to implement security services in SD-WAN.

FIG. 5 conceptually illustrates a process 500 for configuring cloud gateways and service nodes to implement security services in SD-WAN. In some embodiments, one or more processing units (e.g., processor) of a computing device implementing the SD-WAN orchestrator 105 perform the process 500 by executing instructions stored in a computer-readable medium.

In some embodiments, the process 500 starts when the orchestrator identifies (at 510) one or more cloud gateways to receive traffic belonging to a first tenant segment. The orchestrator also identifies (at 520) a first set of security policies for the first tenant segment.

The orchestrator (at 530) then configures a managed service node to implement a first set of T1-SRs (tenant-level service routers) to apply the first set of policies on packet traffic from the first tenant segment. Each T1-SR of the first set of T1-SRs is configured to process traffic having a first VNI that identifies to the first tenant segment, such that the first set of T1-SRs receive packet traffic from the first tenant segment and no other tenant segment.

The orchestrator also configures (at 540) the managed service node to implement a T0-SR (provider-level service router) to relay traffic tunneled by the cloud gateways to the first set of T1-SRs. The T0-SR is a tunnel endpoint for tunnel traffic from the cloud gateways. The T0-SR is also configured to tunnel a packet from a T1-SR back to a cloud gateway that earlier tunnel a corresponding packet to the managed service node. In some embodiments, the orchestrator configures the managed service node by communicating with a network virtualization manager to configure one or more host machines that host the managed service node (e.g., using API of the network virtualization manager.)

The orchestrator then configures (at 550) the identified cloud gateways to tunnel traffic of the first tenant segment to the first set of T1-SRs. The cloud gateways are configured to send packet traffic having the first VNI to a first tunnel endpoint. In some embodiments, each of the cloud gateways is configured to perform the process 400 of FIG. 4. The process 500 then ends.

The one or more cloud gateways may receive traffic belonging to a second tenant segment. The orchestrator may identify a second set of security policies for the second tenant segment, configure the managed service node to implement a second set of T1-SRs to apply the second set of security policies on packet traffic from the second tenant segment, and configure the identified cloud gateways to tunnel traffic of the second tenant segment to the second set of T1-SRs. The T0-SR may be configured to relay the traffic tunneled by the cloud gateways to the second set of T1-SRs. The cloud gateways are configured to receive packet traffic from both the first and second sets of T1-SRs.

In some embodiments, the SD-WAN orchestrator may determine the number of managed service nodes to be provisioned based on capacity required (e.g., 2-4 managed service nodes may be enough for small PoPs, while tens or hundreds of managed service nodes may be necessary for larger PoPs.) The number of managed service nodes may also depend on amount of traffic, number of customers, or complexity of policies being handled, or an input from a user interface.

In some embodiments, the cloud gateway encapsulates packet traffic to tunnel endpoints in the managed service nodes, and the encapsulation of such encapsulated packets includes metadata to indicate the VNI of the tenant segments. The metadata may also include other types of information, such as indicia for identifying which policy or security services to apply to the packet. The T0-SR implemented inside a managed service node decapsulates packet traffic from cloud gateways and encapsulates traffic to the cloud gateways. The T0-SR also demultiplexes packet traffic from cloud gateways to corresponding T1-SRs based on VNIs in the packets and multiplexes packet traffic from T1-SRs back to cloud gateways.

Figure 6:
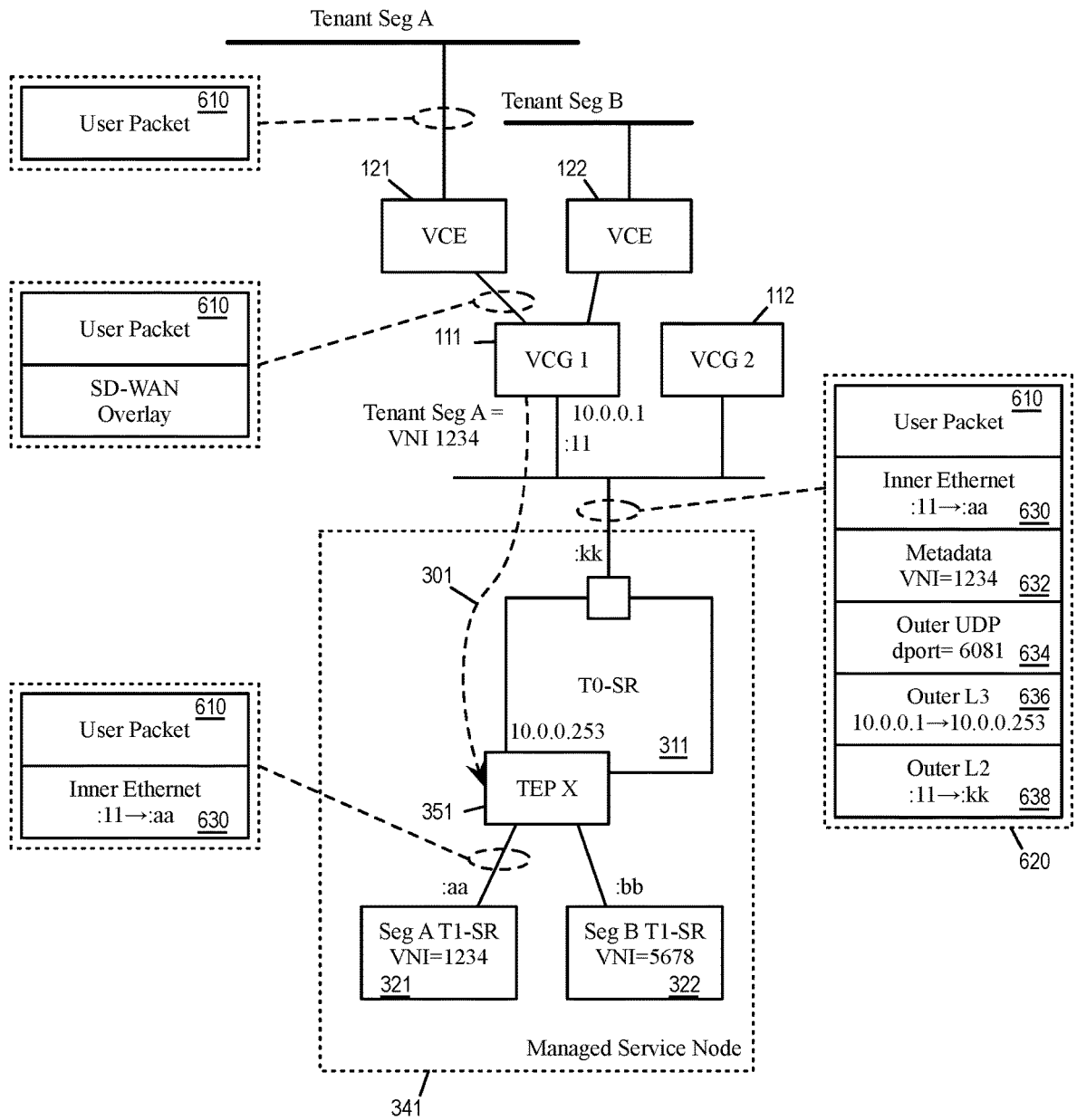
FIG. 6 conceptually illustrates encapsulation and decapsulation of packet traffic from tenant segments to T1-SRs of managed service nodes.

FIG. 6 conceptually illustrates encapsulation and decapsulation of packet traffic from tenant segments to T1-SRs of managed service nodes. As illustrated, the cloud edge 121 receives a user packet 610 from tenant segment A. The cloud edge 121 then sends the packet 610 in a SD-WAN overlay encapsulation to the cloud gateway 111. The cloud gateway 111 encapsulates the packet 610 into an encapsulated packet 620 in an overlay tunnel format (e.g., Geneve tunnel), which includes inner L2 (or ethernet) header 630, metadata 632, outer UDP 634, outer L3 header 636, and outer L2 (or ethernet) header 638. Since the packet 610 came from tenant segment A, the cloud gateway set the metadata 634 to include VNI="1234" to correspond to tenant segment A.

The cloud gateway 121 generates the L2 header 638 by sending out its own source MAC address that is unique among the cloud gateways connected to the managed service node 341. This source MAC address is later used to make sure packet traffic come back to the cloud gateway after service is applied. The destination MAC address belongs to the T1-SR that is targeted to process the packet with services. The cloud gateway also sets the destination outer IP and the destination MAC address based on a specified VNI.

The outer L2 header 638 is used to send the encapsulated packet 620 over L2 switching to the managed service node 341, and the outer L3 header 636 specifies the destination IP address to be 10.0.0.253, which is the address of the tunnel endpoint 351 (TEP X) at the managed service node 341. The T0-SR 311 of the managed service node 341 decapsulates the packet 620 to obtain the metadata 632, which indicates that the packet has a VNI="1234" (which corresponds to tenant segment A.) The T0-SR 311 uses the VNI to select the T1-SR 321 to process the user packet 610 based on security policies implemented at the T1-SR 321. Another T1-SR 322 of the managed node 341 is associated with VNI="5678". Thus, had the encapsulated packet 620 had VNI="5678" (to indicate tenant segment B), the T0-SR 311 would have selected the T1-SR 322 to process the packet. When the T1-SR 322 has finished processing the packet 610 according to its associated security policies (for tenant segment A), the managed service node 341 hairpins the resulting packet to where the original packet 610 came from, namely the cloud gateway 111.

A managed service node may receive packet traffic from multiple different cloud gateways. In the example of FIG. 6, the managed service node 341 can receive packet traffic from both cloud gateways 111 and 112. In some embodiments, the managed service node maintains the identity of the source cloud gateway so the managed service node knows which cloud gateway to return the processing result to, regardless of the packet's VNI or source tenant segment. In some embodiments, the data path of the managed service node multiplexes and demultiplexes traffic while remembering where the packet is from. In some embodiments, each packet is mapped to one of multiple tunnel ports that correspond to different cloud gateways. Each packet from a source cloud gateway arriving at the managed service node for services uses a particular tunnel port that corresponds to the source cloud gateway. The corresponding return traffic would use the same tunnel port to go back to the same cloud gateway.

Figure 7A:
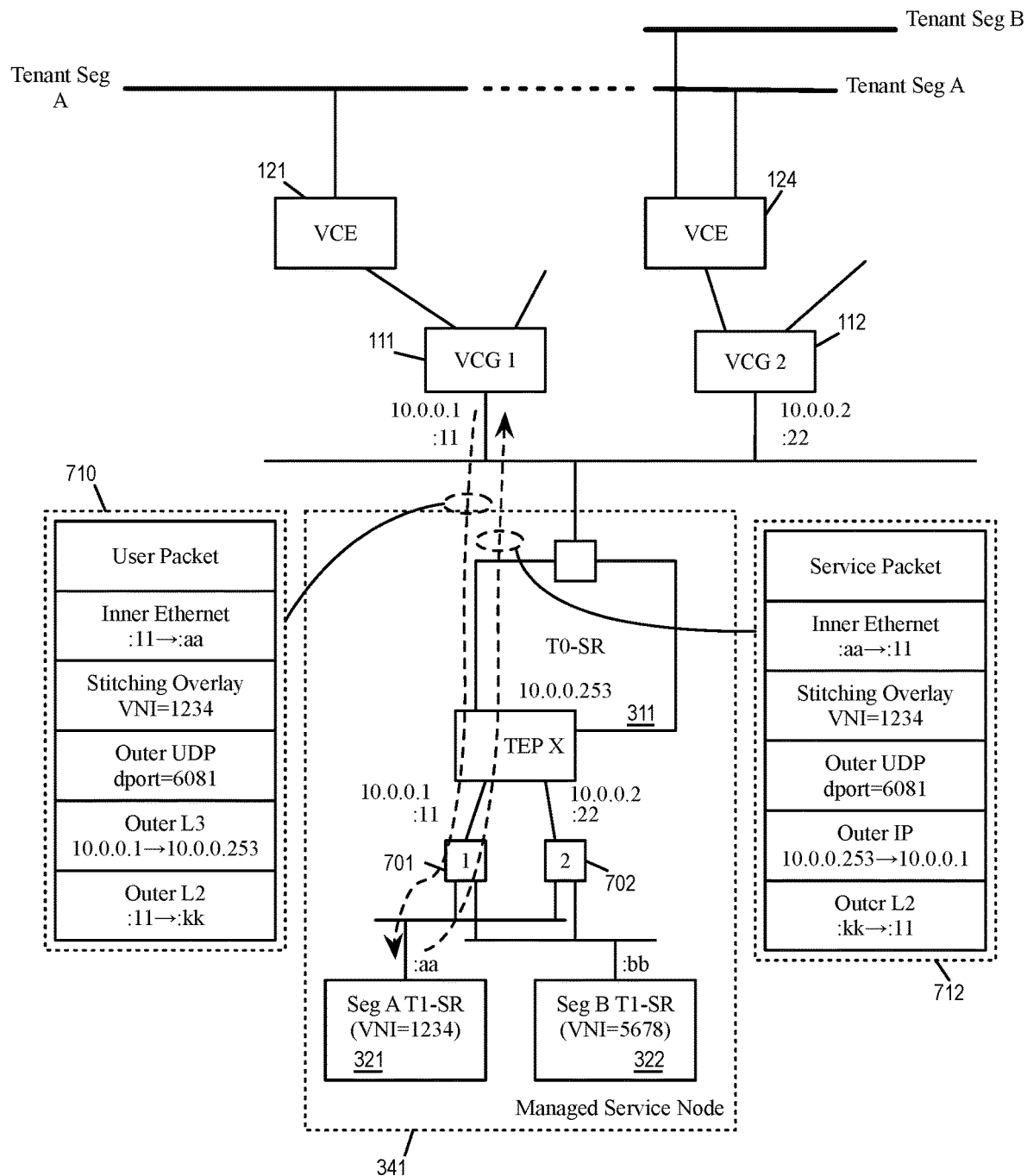
FIGS. 7a-b conceptually illustrate the managed service node returning packets to the source cloud gateway after applying services.
Figure 7B:
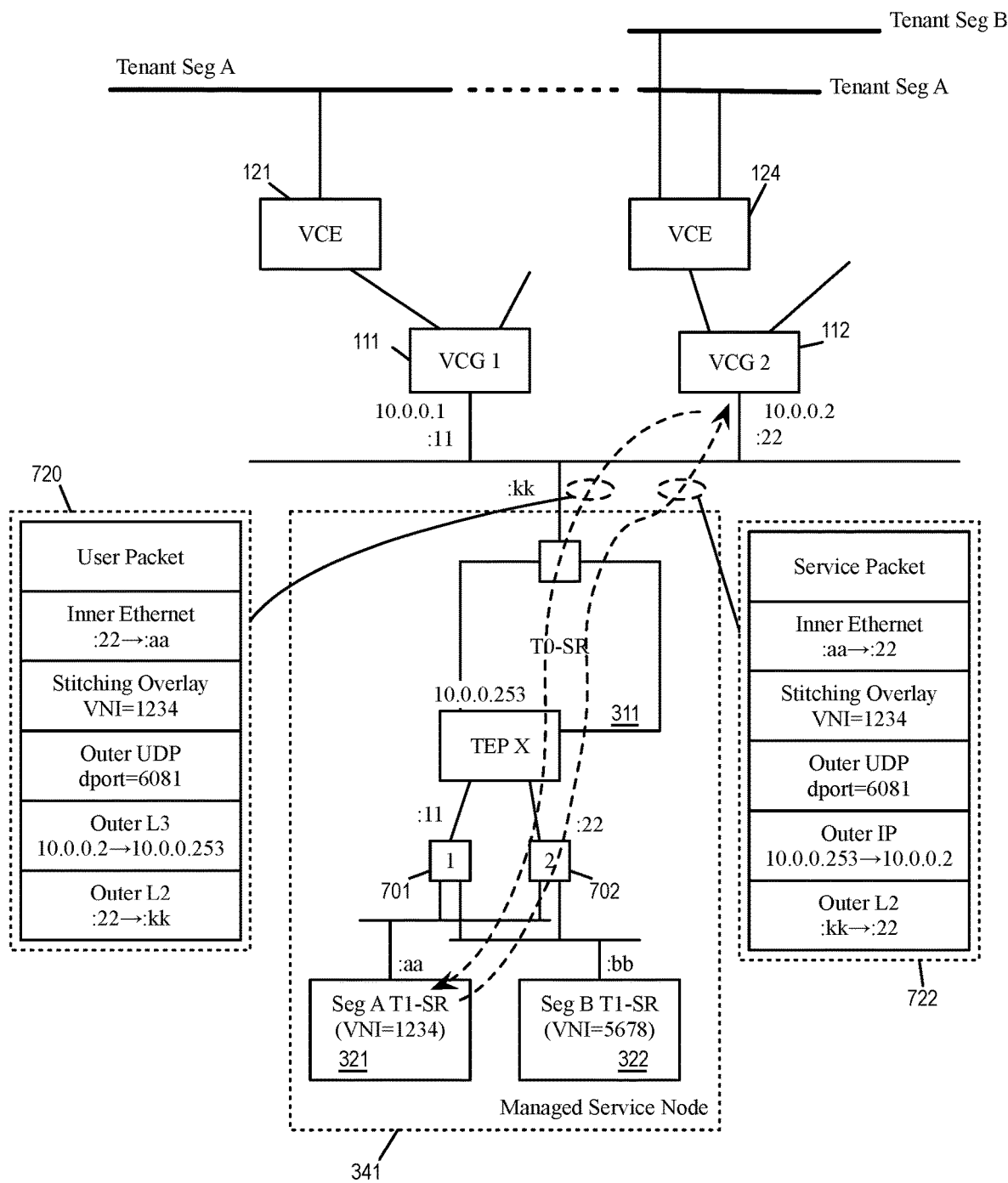

FIGS. 7*a-b* conceptually illustrate the managed service node returning packets to the source cloud gateway after applying services. As illustrated, the managed service node 341 may receive packet traffic from multiple different cloud gateways, including the cloud gateways 111 and 112. The T0-SR 311 of the managed service node 341 sends the received packets to T1-SRs 321 and 322 through tunnel ports 701 or 702, which respectively correspond to cloud gateways 111 and 112. Through backward learning, the tunnel port 701 is associated with source MAC address ":11" or source IP address 10.0.0.1 (which are L2/L3 addresses of the cloud gateway 111), and the tunnel port 702 is associated with source MAC address ":22" or source IP address 10.0.0.2 (which are the L2/L3 addresses of the cloud gateway 112.) The service-applied return packet from the T1-SRs uses the same tunnel port of the original incoming packet to return to the corresponding source cloud gateways.

FIG. 7*a* illustrates the cloud gateway 111 tunneling an encapsulated packet 710 to a tunnel endpoint 10.0.0.253 ("TEP X"), which is hosted by the managed service node 341. The packet 710 has VNI="1234" (tenant segment A) and has an inner L2 header having a source MAC address of ":11", which is the MAC address of the cloud gateway 111. The T0-SR 311 decapsulates the packet 710 and sends the decapsulated packet to T1-SR 321 based on the VNI through the tunnel port 701. The tunnel port 701 learns (or may have already learned) the source address of the packet 710.

The T1-SR 321 applies the security services for the VNI "1234" (tenant segment A) on the packet 710 and returns a resulting packet 712 back to the source of the packet 710. The T0-SR 311 receives the returning packet 712 at the tunnel port 701. Knowing the tunnel port 701 is associated with MAC address ":11" or IP address "10.0.0.1", the T0-SR 311 tunnels the returning packet 712 back to the cloud gateway 111 using those addresses as destination addresses.

FIG. 7*b* illustrates the cloud gateway 112 tunneling an encapsulated packet 720 to the tunnel endpoint 10.0.0.253 ("TEP X") hosted by the managed service node 341. The packet 720 also has VNI="1234" (tenant segment A) and has an inner L2 header having a source MAC address of ":22", which is the MAC address of the cloud gateway 112. The T0-SR 311 decapsulates the packet 720 and sends the decapsulated packet to T1-SR 321 based on the VNI through the tunnel port 702. The tunnel port 702 learns (or may have already learned) the source address of the packet. In some embodiments, packets from different cloud gateways are sent through different tunnel ports, even if those packets are of the same tenant segment having the same VNI and are to be applied the same security services by the same T1-SR.

The T1-SR 321 applies the security services for the VNI "1234" (tenant segment A) on the packet 710 and returns a resulting packet 722 back to the source of the packet 720. The T0-SR 311 receives the returning packet 722 at the tunnel port 702. Knowing the tunnel port 702 is associated with MAC address ":22" or IP address "10.0.0.2", the T0-SR 311 tunnels the returning packet 722 back to the cloud gateway 112 using those addresses as destination addresses.

In some embodiments, the managed service node 341 uses a firewall mechanism to recover the source of the packet for keeping the address mapping in a per-segment context (e.g., in T1-SRs), as different tenant segments may have overlap addressing. When an ingress packet (e.g., the packet 710 or 720) reach the T1-SR 321 initially, the firewall creates a stateful flow entry and stores the original inner L2 header. When the firewall sees an egress packet (e.g., the return packet 712 or 722), the firewall maps it to an existing flow. Since all traffic processed by the managed service node is initiated from the cloud gateway, if the managed service node has an egress packet of one flow, it can be assumed that there was a corresponding ingress packet for the same flow (e.g., the incoming packet 710 and the return packet 712 belong to a first flow; the incoming packet 720 and the return packet 722 belong to a second flow). Based on information of the individual flows, the T1-SR 321 sends the return packet to the same interface it came from and restores the original L2 header (with source and destination swapped around).

In some embodiments, the T0-SR has a trunk VNI port, which is an uplink of the T0-SR for reaching the remote cloud gateways. Since the managed service node receives packets using local IPs, the packets go to a CPU port which terminates local traffic. During decapsulation of the incoming packets, the T0-SR determines whether the packet came from IP address 10.0.0.1 or 10.0.0.2 (i.e., cloud gateway 111 or cloud gateway 112). That IP address is mapped into one of the two tunnel ports 701 and 702. Each of the tunnel ports 701 and 702 is in turn connected to logical switches for different VNIs.

Figure 8:
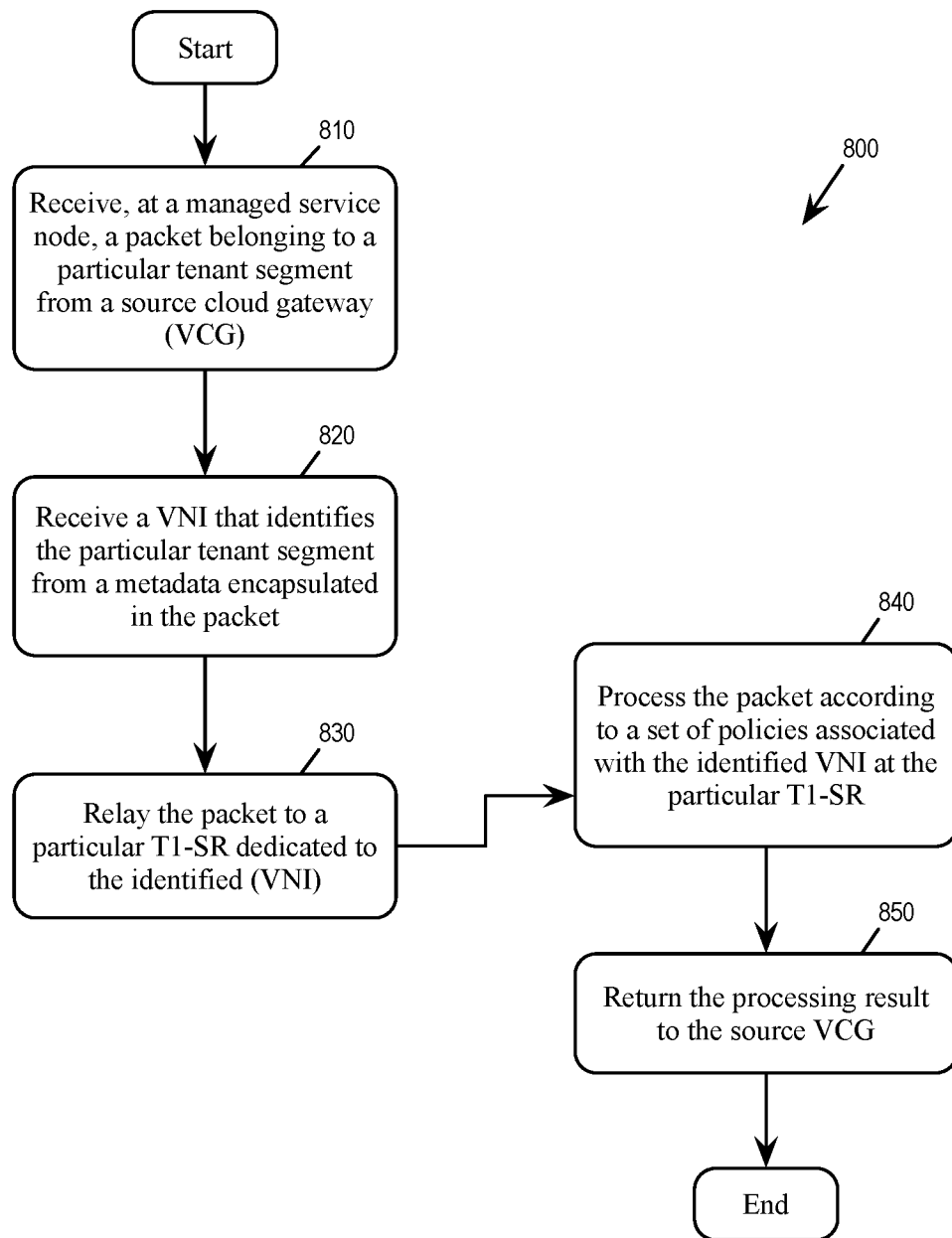
FIG. 8 conceptually illustrates a process for applying security services to packets from cloud gateways and returning packets to the cloud gateways.

FIG. 8 conceptually illustrates a process 800 for applying security services to packets from cloud gateways and returning packets to the cloud gateways. In some embodiments, one or more processing units (e.g., processor) of a computing device implementing a managed service node (managed by a network virtualization manager) perform the process 800 by executing instructions stored in a computer-readable medium.

In some embodiments, the process 800 starts when the managed service node receives (at 810) a packet belonging to a particular tenant segment from a source cloud gateway. The managed service node receives packets belonging to multiple different tenant segments from multiple different cloud gateways.

The managed service node receives (at 820) a VNI that identifies the particular tenant segment from a metadata encapsulated in the packet. In some embodiments, the packet is encapsulated to include the VNI for identifying the particular tenant segment, and the T0-SR of the managed service node is configured to decapsulate packets coming from cloud gateways and encapsulate packets to cloud gateways.

The managed service node relays (at 830) the packet to a particular T1-SR dedicated to the VNI through a tunnel port associated with the source cloud gateway. The service node includes multiple T1-SRs dedicated to multiple different VNIs and multiple tunnel ports that respectively correspond to the multiple cloud gateways. In some embodiments, a tunnel port that corresponds to a cloud gateway is associated with a MAC address of the cloud gateway.

The managed service node processes (at 840) the packet according to a set of policies (i.e., apply security services) associated with the VNI at the particular T1-SR. The managed service node sends (at 850) a return packet to the source cloud gateway through the tunnel port associated to the source cloud gateway. The cloud gateway then uses the VNI of the return packet to identify the tenant segment and to send the return packet to the corresponding cloud edge. The process 800 then ends. In some embodiments, the managed service node stores a set of flow identifiers for the ingress packet and sets a destination address of the egress packet based on the stored set of flow identifiers. The set of flow identifiers includes the L2 MAC address and/or L3 IP address of the source cloud gateway that is unique among the plurality of cloud gateways.

In some embodiments, the network virtualization management deployment provides stateful active-active (A/A) high availability services for SASE to protect against hardware failures in a PoP. Specifically, a pair of managed service nodes (or a grouping of two or more managed service nodes) in a same PoP are configured to jointly provide stateful network security services in A/A configuration. When one managed service node in the pair fails, the other managed service node takes over by assuming the tunnel endpoint and the service states of the failed managed service node.

Figure 9A:
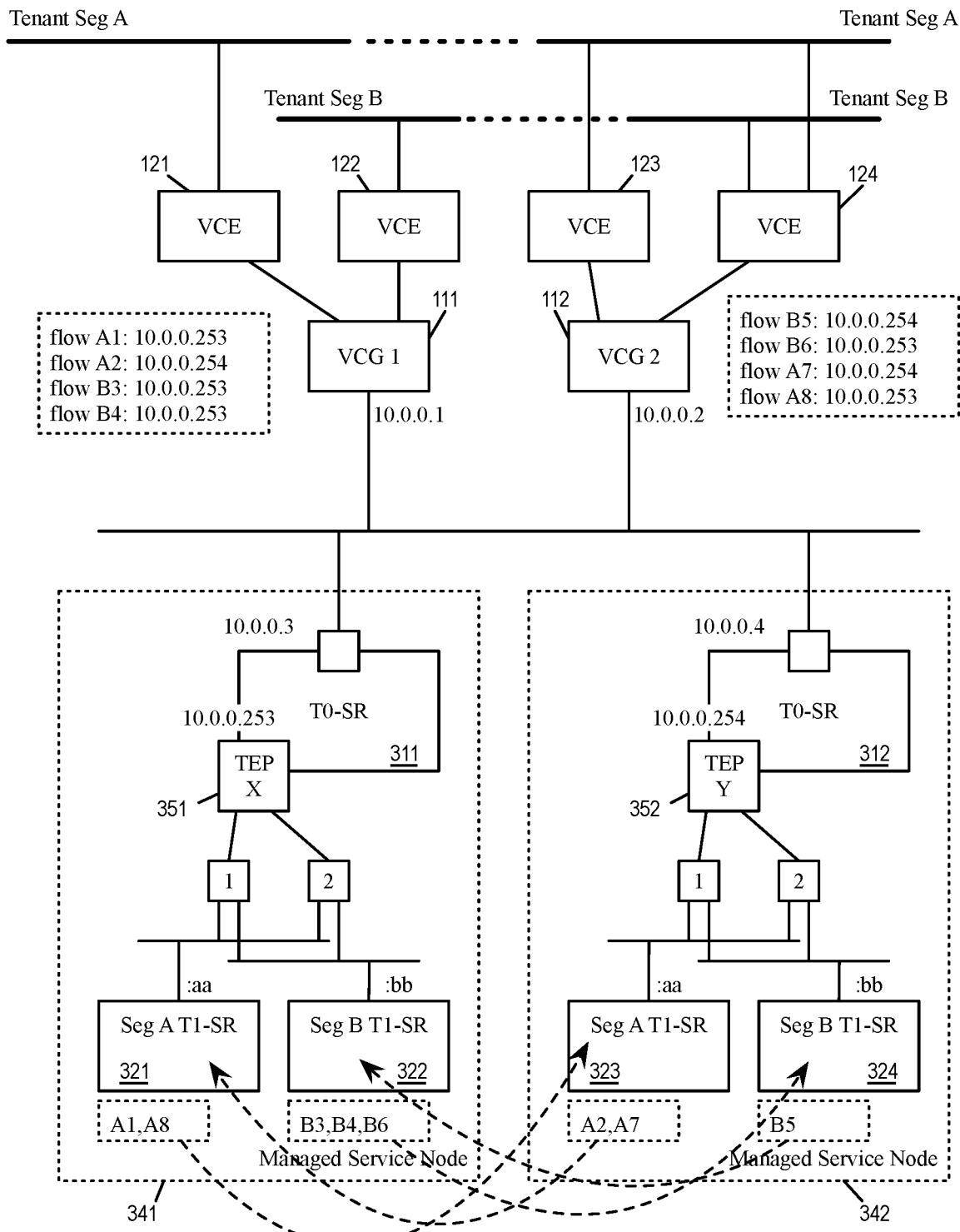
FIGS. 9a-b conceptually illustrate a pairing of two managed service nodes that are in an active-active high availability configuration to provide stateful security services.
Figure 9B:
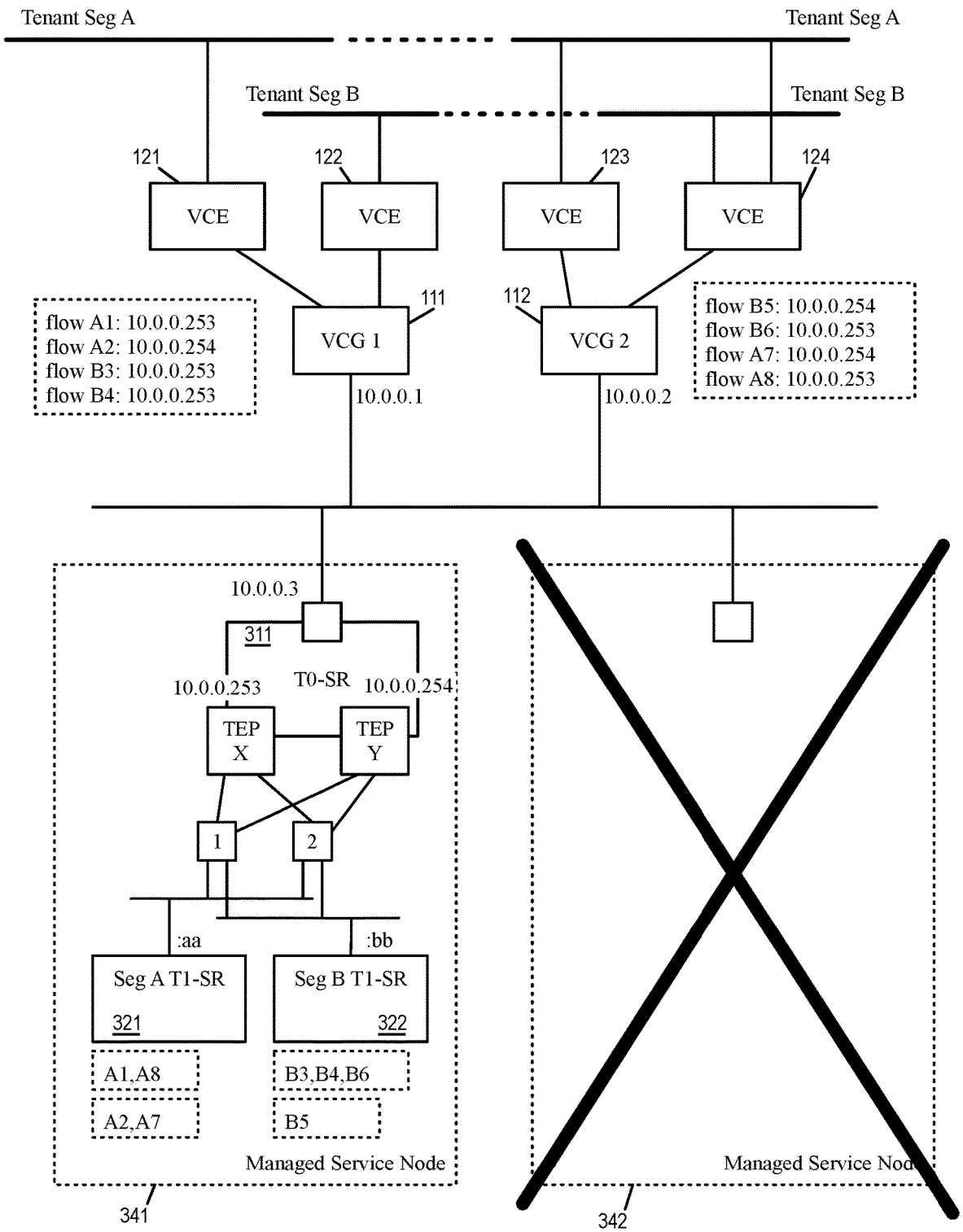

In some embodiments, each cloud gateway sends packets to a pairing of two managed service nodes for applying security services. Each cloud gateway is aware that there are two managed service nodes and can address each managed service node individually. FIGS. 9a-b conceptually illustrate a pairing of two managed service nodes that are in an active-active high availability configuration to provide stateful security services. The figures illustrate two managed service nodes 341 and 342 in a pairing to provide A/A stateful services. The paired managed service nodes may be in a same datacenter or PoP. The managed service node 341 operates the T0-SR 311, segment A T1-SR 321, and segment B T1-SR 322. The managed service node 342 operates the T0-SR 312, segment A T1-SR 323, and segment B T1-SR 324. The pairing of the two managed service nodes hosts two tunnel endpoints 10.0.0.253 and 10.0.0.254. The tunnel endpoint 10.0.0.253 is mapped to 10.0.0.3 (i.e., hosted by managed service node 341) and the tunnel endpoint 10.0.0.254 is mapped to 10.0.0.4 (i.e., hosted by managed service node 342).

A cloud gateway may establish tunnel communications with each of the two managed service nodes. In the example, the cloud gateway 111 (address 10.0.0.1) may establish one tunnel to the managed service node 341 and another tunnel to the managed service node 342. The cloud gateway 112 may do likewise and establish its own two tunnels to the pair of managed service nodes. The cloud gateway 111 (or the cloud gateway 112) may send packet traffic to either tunnel endpoint 10.0.0.253 or 10.0.0.254, as long as it does so statefully (e.g., consistently sending packet of a same flow to the same service node for stateful services.) For example, in the figure, the cloud gateway 111 sends packets of flow A1 to tunnel endpoint 10.0.0.253 and packets of flow A2 to tunnel endpoint 10.0.0.254. Each of the two managed service nodes has its own connections with the cloud gateways, so they are completely independent, and each managed service node has its own set of tunnel ports to support its hairpin return to source cloud gateways as described above by reference to FIGS. 7a-b and 8.

FIG. 9a illustrates operations of the pair of managed service nodes 341 and 342 when both managed service nodes are functioning normally without failure. Since the endpoint 10.0.0.253 is only available in managed service node 341 and the endpoint 10.0.0.254 is only available in managed service node 342, when both managed nodes are working, the managed service node 341 only receives traffic for tunnel endpoint 10.0.0.253 and the managed service node 342 only receives traffic for tunnel endpoint 10.0.0.254.

As mentioned, each cloud gateway may send different flows of a same tenant segment to different tunnel endpoints for processing. As illustrated, the cloud gateway 111 sends flows A1, B3, and B4 to be processed by tunnel endpoint 10.0.0.253 and flow A2 to be processed by tunnel endpoint 10.0.0.254. The cloud gateway 112 sends flows B6 and A8 to be processed by tunnel endpoint 10.0.0.253 and flows B5 and A7 to be processed by tunnel endpoint 10.0.0.254. The T1-SRs 321-324 of the managed edge nodes 341 and 342 in turn receive packets from flows of their respective VNI. Specifically, the T1-SR 321 processes tenant segment A traffic for flows A1 and A8, the T1-SR 322 processes tenant segment B traffic for flows B3, B4, and B6, the T1-SR 323 processes tenant segment A traffic for flows A2 and A7, and the T1-SR 324 processes tenant segment B traffic for flows B5.

In order to support stateful active-active operation, the managed edge nodes in the pair synchronizes or shares the states of their stateful services for the different flows, so when one managed edge node in the A/A pair fails, the counterpart T1-SRs of the remaining managed edge node can take over the stateful operations. In this case, T1-SR 321 shares the states of flows A1 and A8 with T1-SR 323, the T1-SR 322 shares the states of flows B3, B4, and B6 with T1-SR 324, T1-SR 323 shares the states of flows A2 and A7 with T1-SR 321, and T1-SR 324 shares the states of flow B5 with T1-SR 322.

FIG. 9b illustrates operations of the pair of managed edge nodes when one managed node of the pair fails. In the example, the managed edge node 342 has failed and can no longer process traffic. When this occurs, the network virtualization management migrates the tunnel endpoint 10.0.0.254 to managed edge node 341. In other words, the managed edge node 341 now hosts both the tunnel endpoints 10.0.0.253 and 10.0.0.254, and the T0-SR 311 now receives traffic for both tunnel endpoints. Packets that previously went to the edge node 342 for security services now go to the edge node 341. Consequently, the T1-SR 321 serves now A2 and A7 in addition to A1 and A8, while T1-SR 322 now serves B5 in addition to B3, B4, and B6. The T1-SRs 321 and 322 can assume the stateful services of those additional flows because the states of those flows were shared between the two managed edge nodes 341 and 342 while they were both working normally.

Though the managed service node 342 has failed, the cloud gateways 111 and 112 can still send packets to the same two tunnel endpoints (10.0.0.253 and 10.0.0.254), which are now both implemented by the managed service node 341. The cloud gateways may continue to use the same tunnel as the outer encapsulation does not change. Also, in some embodiments, the corresponding T1-SRs (for the same VNI) in the two managed nodes share the same MAC address. (In the example of FIGS. 9a-b, segment A T1-SRs 321 and 323 both have MAC address ":aa"; segment B T1-SRs 322 and 324 both have MAC address ":bb".) Thus, even after the tunnel point migration, the encapsulated packets from the cloud gateways can arrive at the correct T1-SR without changes to the encapsulation by the cloud gateways. Consequently, the orchestrator does not need to reconfigure the cloud gateways to handle the failure, though the cloud gateways may operate with reduced bandwidth as half of the computing resources for providing security services is no longer available.

Figure 10:
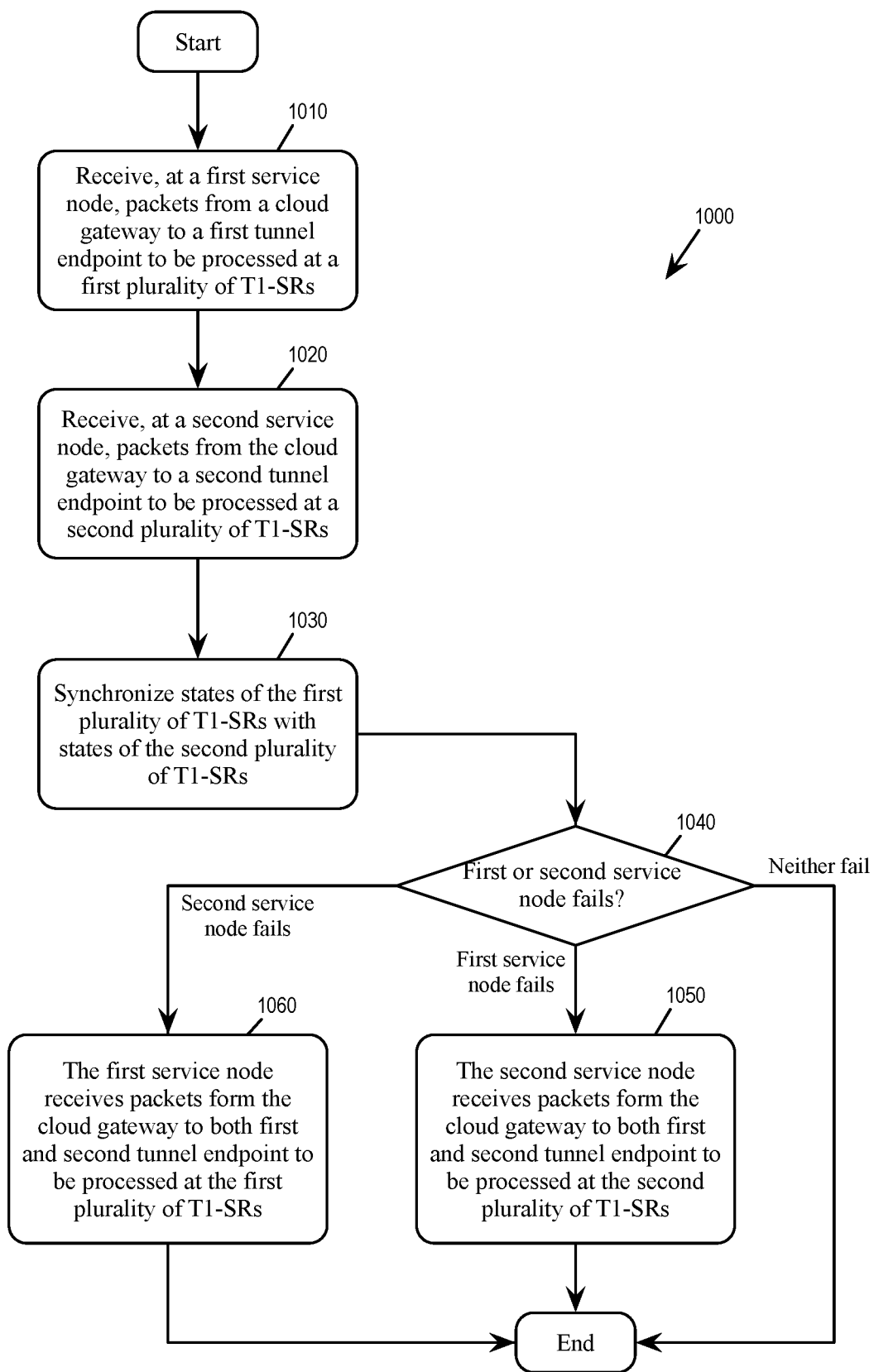
FIG. 10 conceptually illustrates a process for using a pair of managed service nodes in an active-active configuration for providing security services in a SD-WAN.

FIG. 10 conceptually illustrates a process 1000 for using a grouping (e.g., a pair) of managed service nodes in an active-active configuration for providing security services in a SD-WAN. In some embodiments, one or more processing units (e.g., processor) of one or more computing devices implementing a pair of managed service nodes (e.g., managed service nodes 341 and 342 of FIGS. 9a-b) perform the process 1000 by executing instructions stored in a computer-readable medium. Specifically, the computing device(s) executing the process 1000 operates first and second service nodes to process packets from a cloud gateway of a SD-WAN. In some embodiments, the cloud gateway is configured by an orchestrator of the SD-WAN and the first and second service nodes are managed by a network virtualization management software.

The first service node implements a first plurality of T1-SRs that includes a first set of T1-SRs dedicated to a first tenant segment and a second set of T1-SRs dedicated to a second tenant segment. The second service node implements a second plurality of T1-SRs that includes a third set of T1-SRs dedicated to the first tenant segment and a fourth set of T1-SRs dedicated to the second tenant segment. In some embodiments, the first service node implements a first T0-SR for decapsulating and demultiplexing packets to the first plurality of T1-SRs, and the second service node implements a second T0-SR for decapsulating and demultiplexing packets to the second plurality of T1-SRs.

The process 1000 starts when the first service node or the second service node receives packet traffic from a cloud gateway of the SD-SWAN. The first service node receives (at 1010) packets from the cloud gateway to a first tunnel endpoint to be processed at the first plurality of T1-SRs. The second service node receives (at 1020) packets from the cloud gateway to a second tunnel endpoint to be processed at the second plurality of T1-SRs. Each T1-SR of the first and third sets of T1-SRs applies a set of security policies specific to the first tenant segment to packets from the first tenant segments. Each T1-SR of the second and fourth sets of T1-SRs applies a set of security policies specific to the second tenant segment to packets from the second tenant segments.

The first and second service nodes synchronize (at 1030) the states of the first plurality of T1-SRs with states of the second plurality of T1-SRs. Specifically, the states of individual flows processed by the T1-SRs of the first service node are shared with T1-SRs of the second service node and vice versa.

The process 1000 then determines (at 1040) whether the first service node or the second service node have failed. In some embodiments, whether one of the service nodes has failed is determined by the network virtualization management based on a status reported from the service nodes. The network virtualization management in turn configures the two service nodes accordingly (e.g., to have one service node take over the tunnel endpoint of the failed service node.) If the first service node fails, the process 1000 proceeds to 1050. If the second service node fails, the process proceeds to 1060. If neither service node fails, the process 1000 ends.

At 1050 (when the first service node fails), the second service node receives packets from the cloud gateway to both the first and second tunnel endpoints to be processed at the second plurality of T1-SRs. Packets from the first tenant segment to the first and second tunnel endpoints are processed by the third set of T1-SRs and packets from the second tenant segment to the first and second tunnel endpoints are processed by the fourth set of T1-SRs.

At 1060 (when the second service node fails), the first service node receives packets from the cloud gateway to both the first and second tunnel endpoints to be processed at the first plurality of T1-SRs. Packets from the first tenant segment to the first and second tunnel endpoints are processed by the first set of T1-SRs and packets from the second tenant segment to the first and second tunnel endpoints are processed by the second set of T1-SRs. The process 1000 then ends.

In some embodiments, the T1-SRs and T0-SRs as described above not only receive, process, and return packet traffic for local cloud gateways (e.g., of a same PoP), the T1-SRs and T0-SRs may also have uplink and downlink connections with an external network. The external network may refer to the Internet, or any remote site or PoP that requires an uplink to access from the local PoP. The uplink to the remote site can be part of a specific technology to bring together PoPs or datacenters in different locations to create a virtual network.

In some embodiments, a managed service node implementing a T0-SR and one or more T1-SRs performs two layers of address translation on packet traffic going to the external network. The two layers of address translation is for ensuring that the response traffic from the external network can successfully arrive back at the managed service node.

Figure 11A:
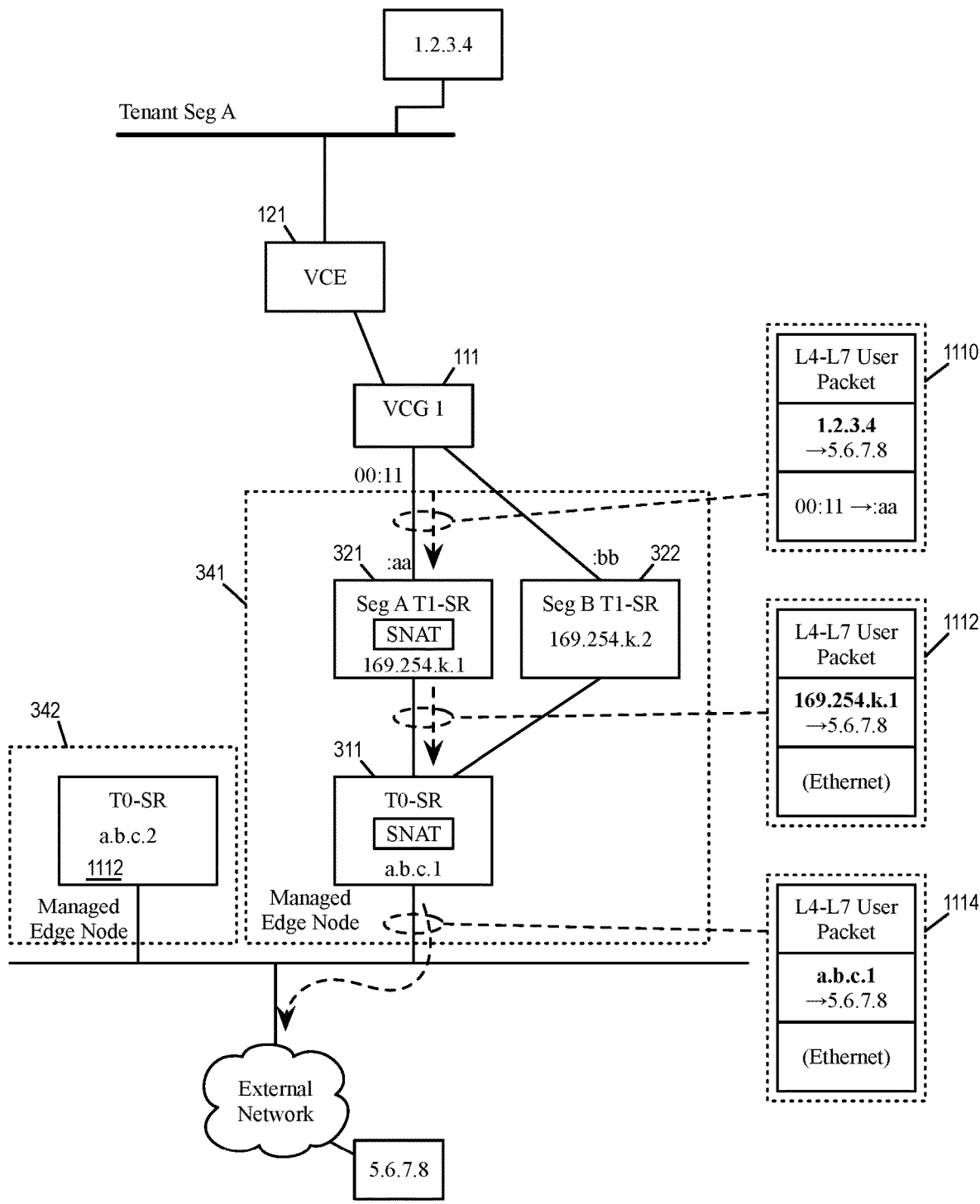
FIGS. 11a-b conceptually illustrate a managed service node using a T0-SR and T1-SRs to send packets from a cloud gateway to an external network.
Figure 11B:
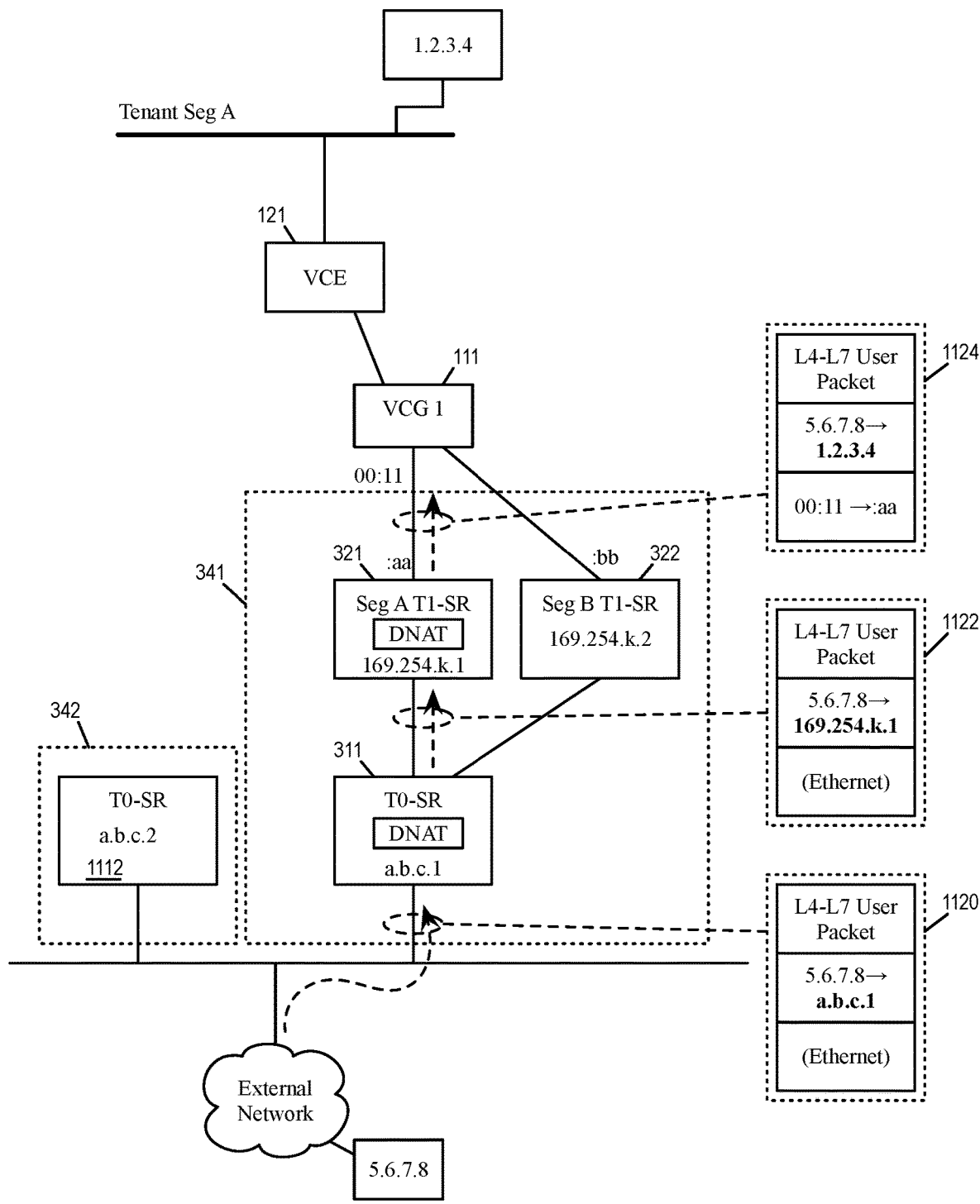

FIGS. 11a-b conceptually illustrate a managed service node using T0-SR and T1-SRs to send packets from a cloud gateway to an external network. FIG. 11a illustrates a packet from cloud gateway egressing to the external network. As illustrated, the managed service node 341 receives a packet 1110 from the cloud gateway 111. The packet 1110 is from a tenant segment A having a source IP 1.2.3.4 and destination IP 5.6.7.8. The cloud gateway 111 forwards the packet 1110 to the managed service node 341 to be processed by the T1-SR 321. The cloud gateway 111 determines that the packet's destination IP "5.6.7.8" is not in a local PoP, but rather in a remote PoP that may or may not be part of the SD-WAN environment. In some embodiments, such externally bound packets are not to be hairpined back to the cloud gateway to be routed but rather have routing performed by a managed service node (at T1-SRs and T0-SRs) before going to the Internet or external network. As illustrated, the managed service node 341 has multiple T1-SRs 321 and 322. Both T1-SRs 321 and 322 are connected to the T0-SR 311. The cloud gateway 111 sends the packet 1110 through L2 switching (from MAC address ":11" to MAC address ":aa") to the T1-SR 321.

Since the packet 1110 is bound for a remote site external to the PoP, it will be sent into the Internet without being further processed by any cloud gateway of the SD-WAN. In some embodiments, in order to send the packet into the external network and be able to receive any corresponding return traffic at the correct T0-SR and T1-SR, the original source address of the packet goes through multiple source network address translation (SNAT) operations. Specifically, T1-SR 321 performs a first SNAT to translate the original source address "1.2.3.4" into 169.254.k.1" (for an intermediate packet 1112), which is a private address of the T1-SR 321 used to distinguish among the multiple different T1-SRs within the managed service node 341. The T0-SR 311 then performs a second SNAT to translate the private address "169.254.k.1" into a public address "a.b.c.1" (for an outgoing packet 1114), which is a public facing IP of the T0-SR 311. The outgoing packet 1114 having "a.b.c.1" as the source address is sent through an uplink into the external network (e.g., Internet) to a destination IP "5.6.7.8". Any corresponding response packet (of the same flow) will arrive at the T0-SR 311 using the IP "a.b.c.1".

FIG. 11*b* illustrates the return of a corresponding response packet. As illustrated, the T0-SR 311 receives a response packet 1120 with the T0-SR's public address "a.b.c.1" as the destination address. T0-SR 311 performs an inverse SNAT (or DNAT) operation to obtain the address "169.254.k.1" to identify T1-SR 321 (as an intermediate packet 1122 to the T1-SR). T1-SR 321 also performs an invert SNAT (or DNAT) operation to obtain the original source address "1.2.3.4" before sending the return packet (as an encapsulated packet 1124) back to the cloud gateway 111. The T0-SR 311 and the T1-SR 321 may perform other stateful operations on the egress packet 1110 or the returning ingress packet 1120, such as security services according to polices associated with a particular tenant segment.

Figure 12:
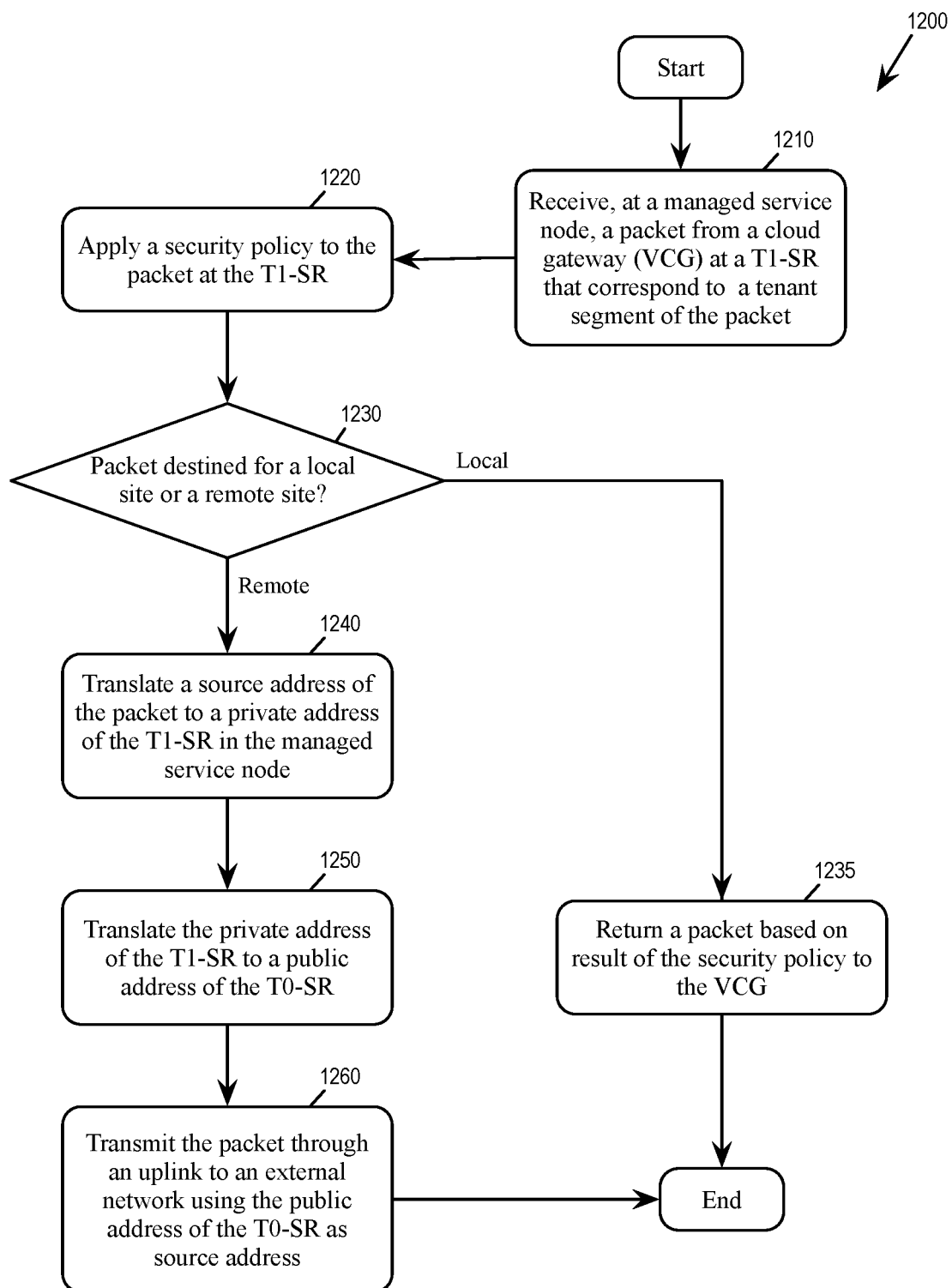
FIG. 12 conceptually illustrates a process for using a managed service node to send packet traffic from the cloud gateway directly into an external network.

FIG. 12 conceptually illustrates a process 1200 for using a managed service node to send packet traffic from the cloud gateway directly into an external network. In some embodiments, one or more processing units (e.g., processor) of one or more computing devices implementing a managed service node (e.g., the managed service nodes 341 and 342 of FIGS. 11*a-b*) perform the process 1200 by executing instructions stored in a computer-readable medium. The service node is configured to operate a T0-SR and a plurality of T1-SRs that corresponds to a plurality of different tenant segments.

The process 1200 starts when the service node receives (at 1210) a packet from a cloud gateway. The cloud gateway is one of a plurality of cloud gateways of a SD-WAN configured to receive packet traffic from different datacenters or branch offices. The cloud gateway is configured by an orchestrator of the SD-WAN and the service node is managed by a network virtualization management software. The cloud gateway and the service node may be hosted by machines located in a same PoP.

The service node applies (at 1220) a security policy to the packet. For example, if the packet is from a first tenant segment, the T1-SR may apply a security policy associated with the first tenant segment to the packet. In some embodiments, if the packet is destined for a remote site, the service node may apply the security policy on a response packet from the external network.

The service node determines (at 1230) whether the packet is destined for a remote site or a local site. The local site may refer to a PoP in which both the service node and the cloud gateway are located, such that the packet traffic may stay in the PoP without going through an external network. The remote site may refer to a destination outside of the SD-WAN, or another PoP that is remote to the local site and can only be accessed through an uplink to an external network. If the packet is destined for a remote site, the process 1200 proceeds to 1240. If the packet is destined for the local site, the service node returns (at 1235) a packet based on a result of the security policy to the cloud gateway. The process 1200 then ends.

The service node translates (at 1240), at a particular T1-SR of the service node, a source address of the packet to a private address of the particular T1-SR. The private address of the T1-SR is used to identify the particular T1-SR among the plurality of T1-SRs behind the T0-SR. The service node translates (at 1250), at a T0-SR of the service node, the private address of the particular T1-SR into a public address of the T0-SR. The service node transmits (at 1260) the packet through an uplink to an external network using the public address of the T0-SR as a source address. The process 1200 ends. The service node may subsequently receive a response packet from the external network at the public address of the T0-SR.

A software defined wide area network (SD-WAN) is a virtual network. A virtual network can be for a corporation, non-profit organizations, educational entities, or other types of business entities. Also, as used in this document, data messages or packets refer to a collection of bits in a particular format sent across a network. One of ordinary skill in the art will recognize that the term data message or packet is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 13A:
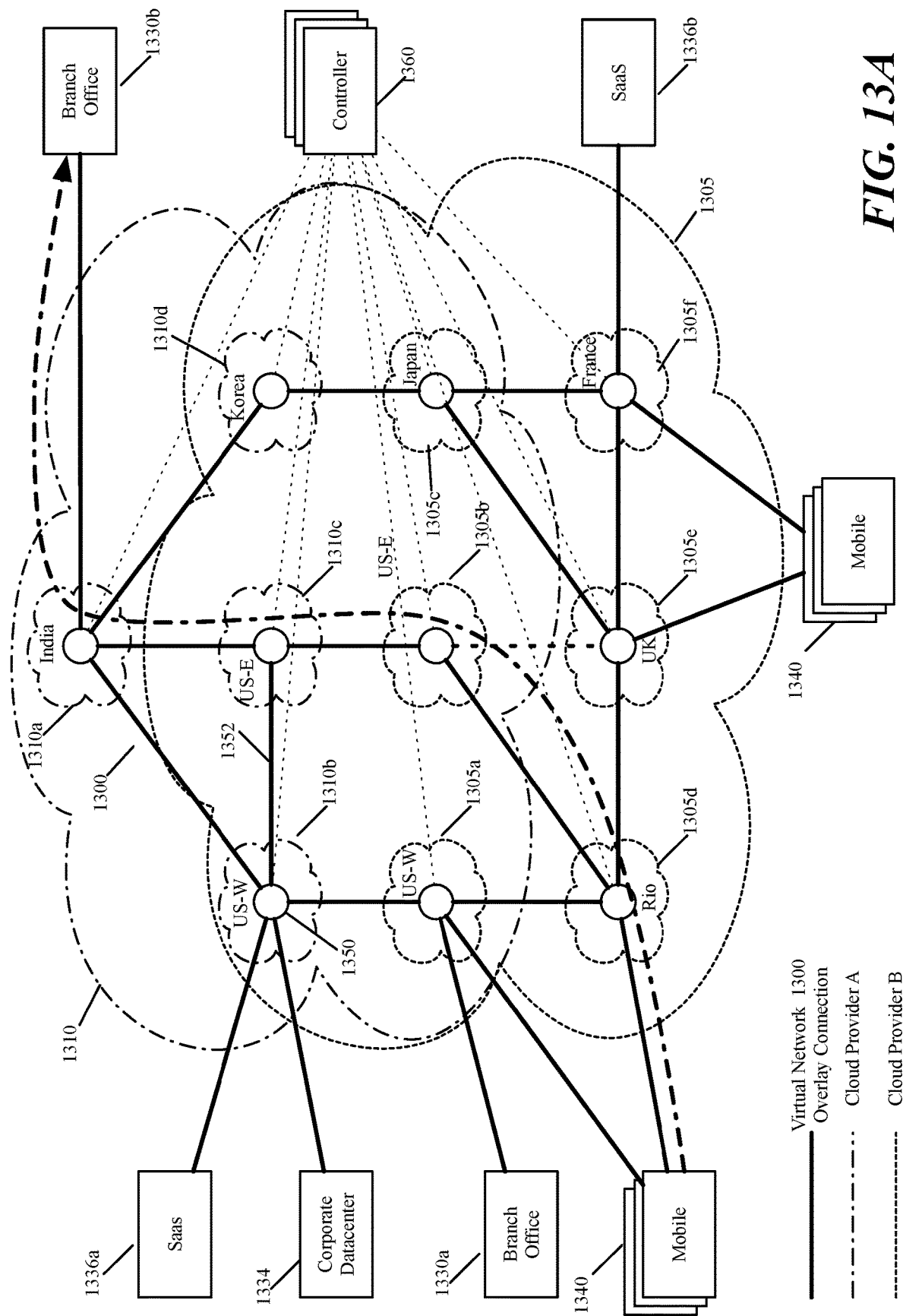

FIG. 13A presents a virtual network 1300 that is defined for a corporation over several public cloud datacenters 1305 and 1310 of two public cloud providers A and B. As shown, the virtual network 1300 is a secure overlay network that is established by deploying different managed forwarding nodes 1350 in different public clouds and connecting the managed forwarding nodes (MFNs) to each other through overlay tunnels 1352. In some embodiments, an MFN is a conceptual grouping of several different components in a public cloud datacenter that with other MFNs (along with other groups of components) in other public cloud datacenters establish one or more overlay virtual networks for one or more entities.

As further described below, the group of components that form an MFN include in some embodiments (1) one or more VPN gateways for establishing VPN connections with an entity's compute nodes (e.g., offices, private datacenters, remote users, etc.) that are external machine locations outside of the public cloud datacenters, (2) one or more forwarding elements for forwarding encapsulated data messages between each other in order to define an overlay virtual network over the shared public cloud network fabric, (3) one or more service machines for performing middlebox service operations as well as L4-L7 optimizations, and (4) one or more measurement agents for obtaining measurements regarding the network connection quality between the public cloud datacenters in order to identify desired paths through the public cloud datacenters. In some embodiments, different MFNs can have different arrangements and different numbers of such components, and one MFN can have different numbers of such components for redundancy and scalability reasons.

Also, in some embodiments, each MFN's group of components execute on different computers in the MFN's public cloud datacenter. In some embodiments, several or all of an MFN's components can execute on one computer of a public cloud datacenter. The components of an MFN in some embodiments execute on host computers that also execute other machines of other tenants. These other machines can be other machines of other MFNs of other tenants, or they can be unrelated machines of other tenants (e.g., compute VMs or containers).

The virtual network 1300 in some embodiments is deployed by a virtual network provider (VNP) that deploys different virtual networks over the same or different public cloud datacenters for different entities (e.g., different corporate customers/tenants of the virtual network provider). The virtual network provider in some embodiments is the entity that deploys the MFNs and provides the controller cluster for configuring and managing these MFNs.

The virtual network 1300 connects the corporate compute endpoints (such as datacenters, branch offices and mobile users) to each other and to external services (e.g., public web services, or SaaS services such as Office365® or Salesforce®) that reside in the public cloud or reside in private datacenter accessible through the Internet. This virtual network 1300 leverages the different locations of the different public clouds to connect different corporate compute endpoints (e.g., different private networks and/or different mobile users of the corporation) to the public clouds in their vicinity. Corporate compute endpoints are also referred to as corporate compute nodes in the discussion below.

In some embodiments, the virtual network 1300 also leverages the high-speed networks that interconnect these public clouds to forward data messages through the public clouds to their destinations or to get as close to their destinations while reducing their traversal through the Internet. When the corporate compute endpoints are outside of public cloud datacenters over which the virtual network spans, these endpoints are referred to as external machine locations. This is the case for corporate branch offices, private datacenters and devices of remote users.

In the example illustrated in FIG. 13A, the virtual network 1300 spans six datacenters 1305*a*-1305*f* of the public cloud provider A and four datacenters 1310*a*-1310*d* of the public cloud provider B. In spanning these public clouds, this virtual network 1300 connects several branch offices, corporate datacenters, SaaS providers, and mobile users of the corporate tenant that are located in different geographic regions. Specifically, the virtual network 1300 connects two branch offices 1330*a* and 1330*b* in two different cities (e.g., San Francisco, Calif., and Pune, India), a corporate datacenter 1334 in another city (e.g., Seattle, Wash.), two SaaS provider datacenters 1336*a* and 1336*b* in another two cities (Redmond, Wash., and Paris, France), and mobile users 1340 at various locations in the world. As such, this virtual network 1300 can be viewed as a virtual corporate WAN.

In some embodiments, the branch offices 1330*a* and 1330*b* have their own private networks (e.g., local area networks) that connect computers at the branch locations and branch private datacenters that are outside of public clouds. Similarly, the corporate datacenter 1334 in some embodiments has its own private network and resides outside of any public cloud datacenter. In other embodiments, however, the corporate datacenter 1334 or the datacenter of the branch office 1330*a* and 1330*b* can be within a public cloud, but the virtual network 1300 does not span this public cloud, as the corporate datacenter 1334 or branch office datacenters 1330*a* and 1330*b* connect to the edge of the virtual network 1300.

As mentioned above, the virtual network 1300 is established by connecting different deployed managed forwarding nodes 1350 in different public clouds through overlay tunnels 1352. Each managed forwarding node 1350 includes several configurable components. As further described above and further described below, the MFN components include in some embodiments software-based measurement agents, software forwarding elements (e.g., software routers, switches, gateways, etc.), layer 4 proxies (e.g., TCP proxies) and middlebox service machines (e.g., VMs, containers, etc.). One or more of these components in some embodiments use standardized or commonly available solutions, such as Open vSwitch, OpenVPN, strongSwan, etc.

In some embodiments, each MFN (i.e., the group of components that conceptually forms an MFN) can be shared by different tenants of the virtual network provider that deploys and configures the MFNs in the public cloud datacenters. Conjunctively, or alternatively, the virtual network provider in some embodiments can deploy a unique set of MFNs in one or more public cloud datacenters for a particular tenant. For instance, a particular tenant might not wish to share MFN resources with another tenant for security reasons or quality of service reasons. For such a tenant, the virtual network provider can deploy its own set of MFNs across several public cloud datacenters.

In some embodiments, a logically centralized controller cluster 1360 (e.g., a set of one or more controller servers) operates inside or outside of one or more of the public clouds 1305 and 1310 and configures the public-cloud components of the managed forwarding nodes 1350 to implement the virtual network 1300 over the public clouds 1305 and 1310. In some embodiments, the controllers in this cluster 1360 are at various different locations (e.g., are in different public cloud datacenters) in order to improve redundancy and high availability. The controller cluster 1360 in some embodiments scales up or down the number of public cloud components that are used to establish the virtual network 1300, or the compute or network resources allocated to these components.

Figure 13C:
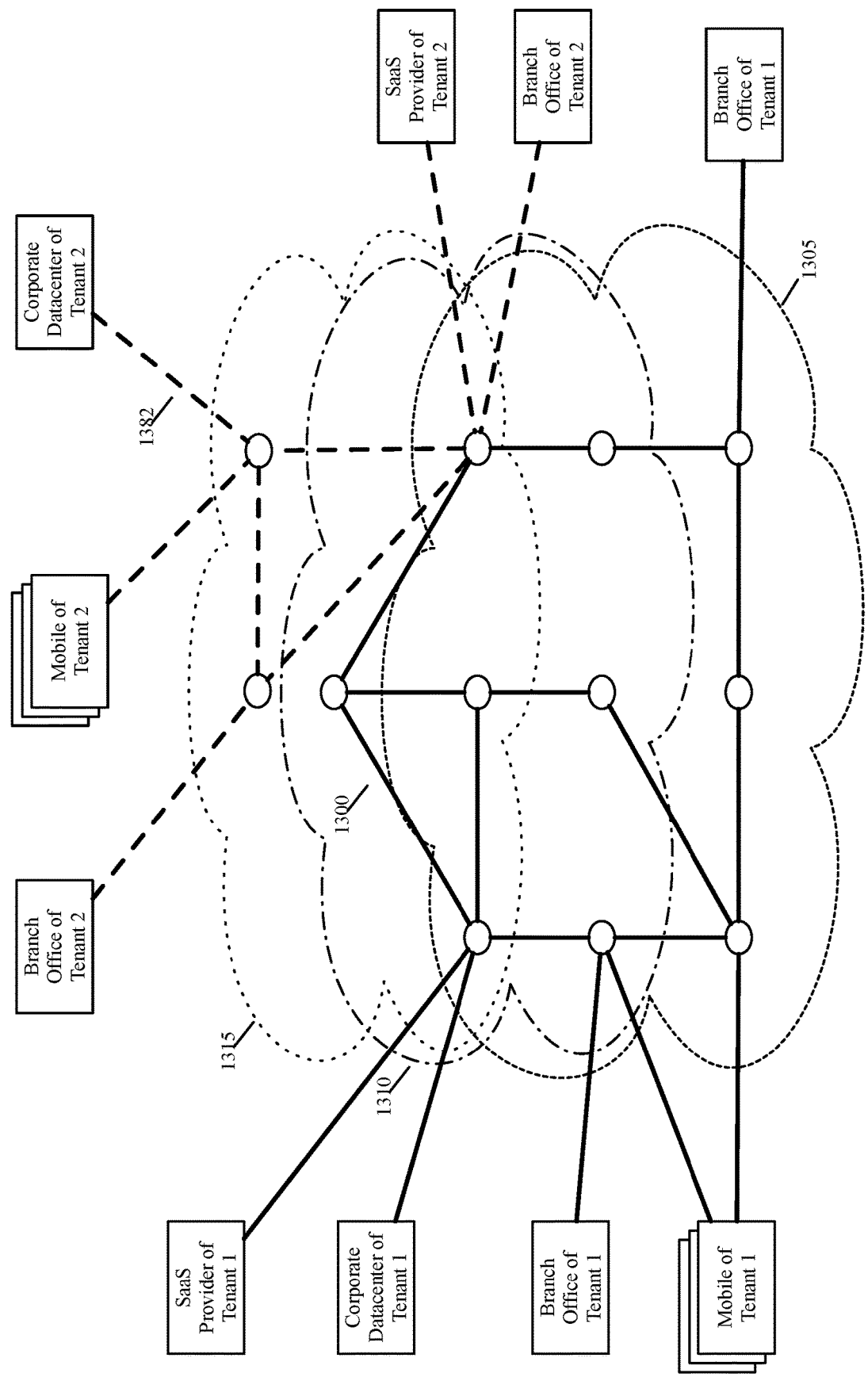

In some embodiments, the controller cluster 1360, or another controller cluster of the virtual network provider, establishes a different virtual network for another corporate tenant over the same public clouds 1305 and 1310, and/or over different public clouds of different public cloud providers. In addition to the controller cluster(s), the virtual network provider in other embodiments deploys forwarding elements and service machines in the public clouds that allow different tenants to deploy different virtual networks over the same or different public clouds. FIG. 13B illustrates an example of two virtual networks 1300 and 1380 for two corporate tenants that are deployed over the public clouds 1305 and 1310. FIG. 13C alternatively illustrates an example of two virtual networks 1300 and 1382, with one network 1300 deployed over public clouds 1305 and 1310, and the other virtual network 1382 deployed over another pair of public clouds 1310 and 1315.

Through the configured components of the MFNs, the virtual network 1300 of FIG. 13A allows different private networks and/or different mobile users of the corporate tenant to connect to different public clouds that are in optimal locations (e.g., as measured in terms of physical distance, in terms of connection speed, loss, delay and/or cost, and/or in terms of network connection reliability, etc.) with respect to these private networks and/or mobile users. These components also allow the virtual network 1300 in some embodiments to use the high-speed networks that interconnect the public clouds 1305 and 1310 to forward data messages through the public clouds 1305 and 1310 to their destinations while reducing their traversal through the Internet.

Figure 14:
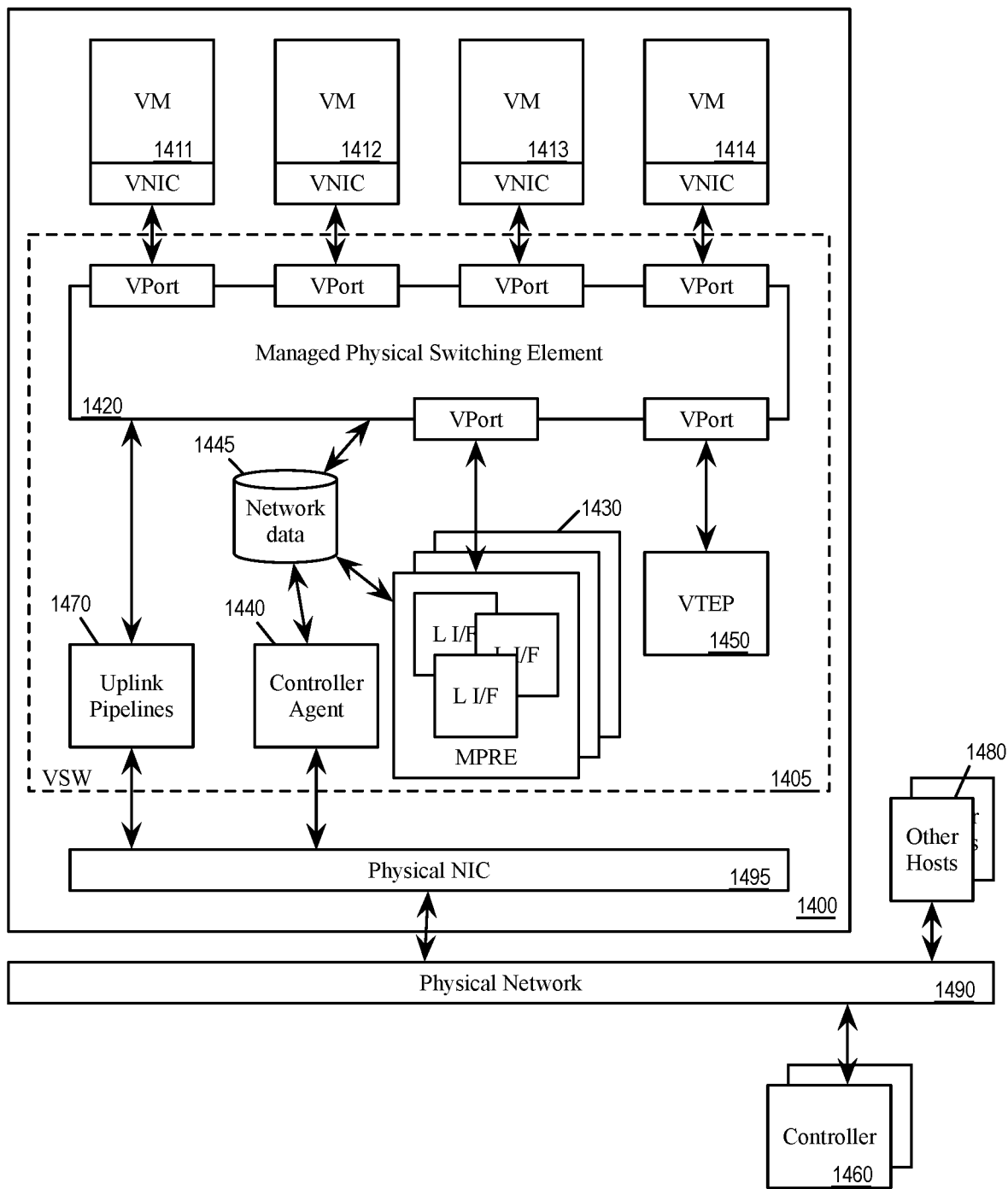
FIG. 14 illustrates a computing device that serves as a host machine that runs virtualization software FIG. 15 conceptually illustrates a computer system with which some embodiments of the invention are implemented.

In some embodiments, a managed service node may be implemented by a host machine that is running virtualization software, serving as a virtual network forwarding engine. Such a virtual network forwarding engine is also known as managed forwarding element (MFE), or hypervisors. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 14 illustrates a computing device 1400 that serves as a host machine that runs virtualization software for some embodiments of the invention.

As illustrated, the computing device 1400 has access to a physical network 1490 through a physical NIC (PNIC) 1495. The host machine 1400 also runs the virtualization software 1405 and hosts VMs 1411-1414. The virtualization software 1405 serves as the interface between the hosted VMs 1411-1414 and the physical MC 1495 (as well as other physical resources, such as processors and memory). Each of the VMs 1411-1414 includes a virtual MC (VNIC) for accessing the network through the virtualization software 1405. Each VNIC in a VM 1411-1414 is responsible for exchanging packets between the VM 1411-1414 and the virtualization software 1405. In some embodiments, the VNICs are software abstractions of physical NICs implemented by virtual NIC emulators.

The virtualization software 1405 manages the operations of the VMs 1411-1414, and includes several components for managing the access of the VMs 1411-1414 to the physical network 1490 (by implementing the logical networks to which the VMs connect, in some embodiments). As illustrated, the virtualization software 1405 includes several components, including a MPSE 1420, a set of MPREs 1430, a controller agent 1440, a network data storage 1445, a VTEP 1450, and a set of uplink pipelines 1470.

The VTEP (virtual tunnel endpoint) 1450 allows the host machine 1400 to serve as a tunnel endpoint for logical network traffic. An example of the logical network traffic is traffic for Virtual Extensible LAN (VXLAN), which is an overlay network encapsulation protocol. An overlay network created by VXLAN encapsulation is sometimes referred to as a VXLAN network, or simply VXLAN. When a VM 1411-1414 on the host machine 1400 sends a data packet (e.g., an Ethernet frame) to another VM in the same VXLAN network but on a different host (e.g., other machines 1480), the VTEP 1450 will encapsulate the data packet using the VXLAN network's VNI and network addresses of the VTEP 1450, before sending the packet to the physical network 1490. The packet is tunneled through the physical network 1490 (i.e., the encapsulation renders the underlying packet transparent to the intervening network elements) to the destination host. The VTEP at the destination host decapsulates the packet and forwards only the original inner data packet to the destination VM. In some embodiments, the VTEP module 1450 serves only as a controller interface for VXLAN encapsulation, while the encapsulation and decapsulation of VXLAN packets is accomplished at the uplink module 1470.

The controller agent 1440 receives control plane messages from a controller 1460 (e.g., a CCP node) or a cluster of controllers. In some embodiments, these control plane messages include configuration data for configuring the various components of the virtualization software 1405 (such as the MPSE 1420 and the MPREs 1430) and/or the virtual machines 1411-1414. In some embodiments, the configuration data includes those for configuring an edge node, specifically the tenant-level service routers (T1-SRs) and provider-level service routers (T0-SRs).

In the example illustrated in FIG. 14, the controller agent 1440 receives control plane messages from the controller cluster 1460 from the physical network 1490 and in turn provides the received configuration data to the MPREs 1430 through a control channel without going through the MPSE 1420. However, in some embodiments, the controller agent 1440 receives control plane messages from a direct data conduit (not illustrated) independent of the physical network 1490. In some other embodiments, the controller agent 1440 receives control plane messages from the MPSE 1420 and forwards configuration data to the router 1430 through the MPSE 1420.

The network data storage 1445 in some embodiments stores some of the data that are used and produced by the logical forwarding elements of the host machine 1400 (logical forwarding elements such as the MPSE 1420 and the MPRE 1430). Such stored data in some embodiments include forwarding tables and routing tables, connection mappings, as well as packet traffic statistics. These stored data are accessible by the controller agent 1440 in some embodiments and delivered to another computing device.

The MPSE 1420 delivers network data to and from the physical NIC 1495, which interfaces the physical network 1490. The MPSE 1420 also includes a number of virtual ports (vPorts) that communicatively interconnect the physical NIC 1495 with the VMs 1411-1414, the MPREs 1430, and the controller agent 1440. Each virtual port is associated with a unique L2 MAC address, in some embodiments. The MPSE 1420 performs L2 link layer packet forwarding between any two network elements that are connected to its virtual ports. The MPSE 1420 also performs L2 link layer packet forwarding between any network element connected to any one of its virtual ports and a reachable L2 network element on the physical network 1490 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1430 perform L3 routing on data packets received from a virtual port on the MPSE 1420. In some embodiments, this routing operation entails resolving a L3 IP address to a next-hop L2 MAC address and a next-hop VNI (i.e., the VNI of the next-hop's L2 segment). Each routed data packet is then sent back to the MPSE 1420 to be forwarded to its destination according to the resolved L2 MAC address. This destination can be another VM connected to a virtual port on the MPSE 1420, or a reachable L2 network element on the physical network 1490 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router" and a MPSE is referred to as a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or a local MPSE running in each host machine.

In some embodiments, the MPRE 1430 includes one or more logical interfaces (LIFs) that each serve as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order to indicate in which host machine the MPRE operates.

The uplink module 1470 relays data between the MPSE 1420 and the physical NIC 1495. The uplink module 1470 includes an egress chain and an ingress chain that each perform a number of operations. Some of these operations are pre-processing and/or post-processing operations for the MPRE 1430.

As illustrated by FIG. 14, the virtualization software 1405 has multiple MPREs 1430 for multiple, different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE, and hence a same L2 MAC address (vMAC or pMAC). In some other embodiments, each different MPRE belonging to a different tenant has its own port to the MPSE.

The MPSE 1420 and the MPRE 1430 make it possible for data packets to be forwarded amongst VMs 1411-1414 without being sent through the external physical network 1490 (so long as the VMs connect to the same logical network, as different tenants' VMs will be isolated from each other). Specifically, the MPSE 1420 performs the functions of the local logical switches by using the VNIs of the various L2 segments (i.e., their corresponding L2 logical switches) of the various logical networks. Likewise, the MPREs 1430 perform the function of the logical routers by using the VNIs of those various L2 segments. Since each L2 segment/L2 switch has its own a unique VNI, the host machine 1400 (and its virtualization software 1405) is able to direct packets of different logical networks to their correct destinations and effectively segregate traffic of different logical networks from each other.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
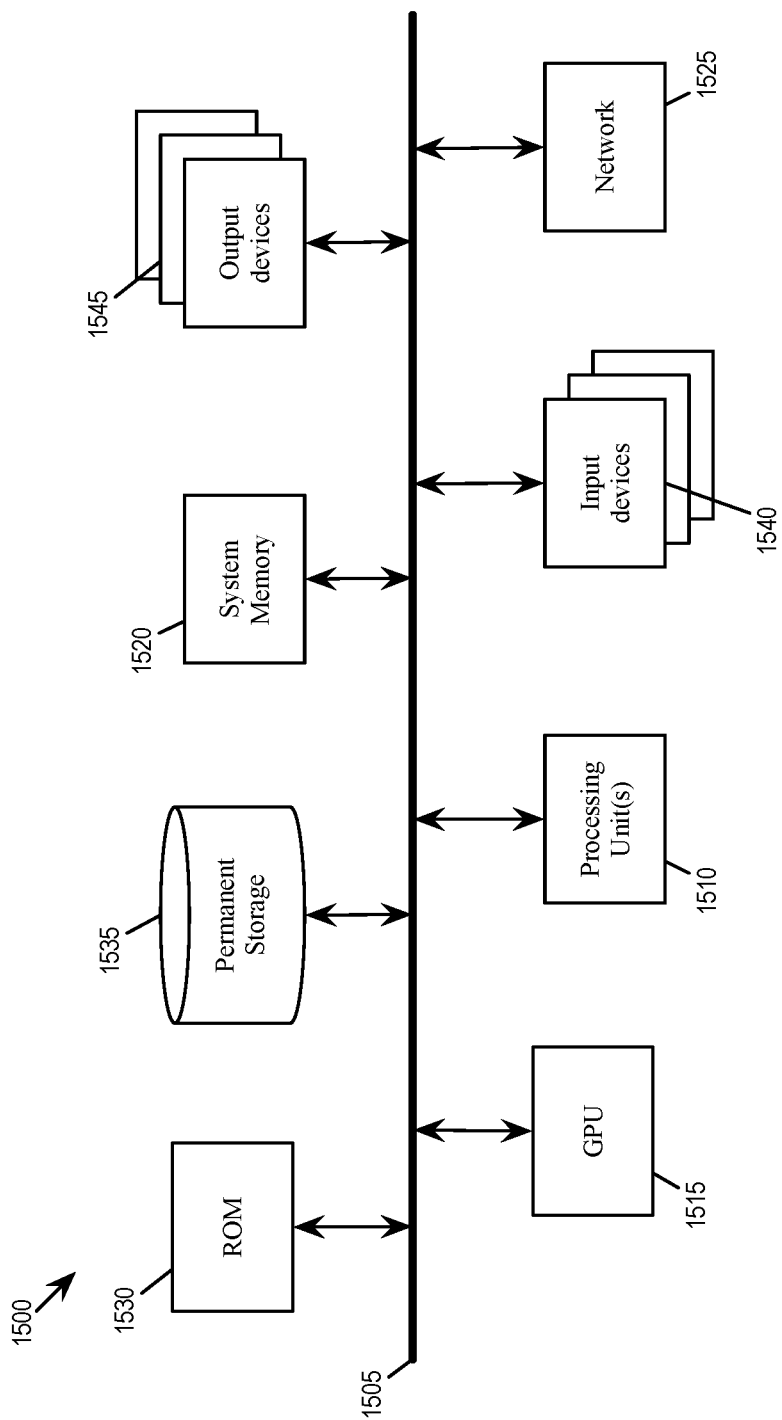

FIG. 15 conceptually illustrates a computer system 1500 with which some embodiments of the invention are implemented. The computer system 1500 can be used to implement any of the above-described hosts, controllers, and managers. As such, it can be used to execute any of the above-described processes. This computer system 1500 includes various types of non-transitory machine-readable media and interfaces for various other types of machine-readable media. Computer system 1500 includes a bus 1505, processing unit(s) 1510, a system memory 1520, a read-only memory 1530, a permanent storage device 1535, input devices 1540, and output devices 1545.

The bus 1505 collectively represents all system, peripheral, and chipset buses that communicatively connect the numerous internal devices of the computer system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) 1510 may be a single processor or a multi-core processor in different embodiments. The read-only-memory (ROM) 1530 stores static data and instructions that are needed by the processing unit(s) 1510 and other modules of the computer system 1500. The permanent storage device 1535, on the other hand, is a read-and-write memory device. This device 1535 is a non-volatile memory unit that stores instructions and data even when the computer system 1500 is off. Some embodiments of the invention use a massstorage device (such as a magnetic or optical disk and its corresponding disk drive) as the permanent storage device 1535.

Other embodiments use a removable storage device (such as a floppy disk, flash drive, etc.) as the permanent storage device 1535. Like the permanent storage device 1535, the system memory 1520 is a read-and-write memory device. However, unlike storage device 1535, the system memory 1520 is a volatile read-and-write memory, such as random access memory. The system memory 1520 stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices 1540 enable the user to communicate information and select commands to the computer system 1500. The input devices 1540 include alphanumeric keyboards and pointing devices (also called "cursor control devices"). The output devices 1545 display images generated by the computer system 1500. The output devices 1545 include printers and display devices, such as cathode ray tubes (CRT) or liquid crystal displays (LCD). Some embodiments include devices such as a touchscreen that function as both input and output devices 1540 and 1545.

Finally, as shown in FIG. 15, bus 1505 also couples computer system 1500 to a network 1525 through a network adapter (not shown). In this manner, the computer 1500 can be a part of a network of computers (such as a local area network ("LAN"), a wide area network ("WAN"), or an Intranet, or a network of networks, such as the Internet. Any or all components of computer system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    operating first and second service nodes to process packets from a cloud gateway of a software-defined wide area network (SD-WAN),
    wherein the first service node comprises a first plurality of tenant service routers (T1-SRs) that includes a first set of T1-SRs dedicated to a first tenant segment and a second set of T1-SRs dedicated to a second tenant segment,
    wherein the second service node comprises a second plurality of T1-SRs that includes a third set of T1-SRs dedicated to the first tenant segment and a fourth set of T1-SRs dedicated to the second tenant segment;
    receiving, at the first service node, packets from the cloud gateway to a first tunnel endpoint to be processed at the first plurality of T1-SRs;
    receiving, at the second service node, packets from the cloud gateway to a second tunnel endpoint to be processed at the second plurality of T1-SRs;
    wherein when the first service node fails, the second service node receives packets from the cloud gateway to both the first and second tunnel endpoints to be processed at the second plurality of T1-SRs.

2. The method of claim 1, wherein a T1-SR dedicated to the first tenant segment in the first plurality of T1-SRs has a same MAC address as a T1-SR dedicated to the first tenant segment in the second plurality of T1-SRs.

3. The method of claim 1, wherein the first service node implements a first provider service router (T0-SR) for decapsulating and demultiplexing packets to the first plurality of T1-SRs and the second service node implements a second T0-SR for decapsulating and demultiplexing packets to the second plurality of T1-SRs.

4. The method of claim 1, wherein each T1-SR of the first and third sets of T1-SRs is for applying a set of security policies specific to the first tenant segment to packets from the first tenant segments.

5. The method of claim 1, wherein the cloud gateway is configured by an orchestrator of the SD-WAN and the first and second service nodes are managed by a network virtualization management software.

6. The method of claim 1, wherein the states of the second plurality of T1-SRs are synchronized with the states of the first plurality of T1-SRs.

7. The method of claim 1, wherein when the first service node fails,
packets from the first tenant segment to the first and second tunnel endpoints are processed by the third set of T1-SRs and
packets from the second tenant segment to the first and second tunnel endpoints are processed by the fourth set of T1-SRs.

8. The method of claim 1, wherein when the second service node fails, the first service node receives packets from the cloud gateway to both the first and second tunnel endpoints to be processed at the first plurality of T1-SRs.

9. A computing device comprising:
one or more processors; and
a computer-readable storage medium storing a plurality of computer-executable components that are executable by the one or more processors to perform a plurality of actions, the plurality of actions comprising:
operating first and second service nodes to process packets from a cloud gateway of a software-defined wide area network (SD-WAN),
wherein the first service node comprises a first plurality of tenant service routers (T1-SRs) that includes a first set of T1-SRs dedicated to a first tenant segment and a second set of T1-SRs dedicated to a second tenant segment,
wherein the second service node comprises a second plurality of T1-SRs that includes a third set of T1-SRs dedicated to the first tenant segment and a fourth set of T1-SRs dedicated to the second tenant segment;
receiving, at the first service node, packets from the cloud gateway to a first tunnel endpoint to be processed at the first plurality of T1-SRs;
receiving, at the second service node, packets from the cloud gateway to a second tunnel endpoint to be processed at the second plurality of T1-SRs;
wherein when the first service node fails, the second service node receives packets from the cloud gateway to both the first and second tunnel endpoints to be processed at the second plurality of T1-SRs.

10. The computing device of claim 9, wherein a T1-SR dedicated to the first tenant segment in the first plurality of T1-SRs has a same MAC address as a T1-SR dedicated to the first tenant segment in the second plurality of T1-SRs.

11. The computing device of claim 9, wherein the first service node implements a first provider service router (T0-SR) for decapsulating and demultiplexing packets to the first plurality of T1-SRs and the second service node implements a second T0-SR for decapsulating and demultiplexing packets to the second plurality of T1-SRs.

12. The computing device of claim 9, wherein each T1-SR of the first and third sets of T1-SRs is for applying a set of security policies specific to the first tenant segment to packets from the first tenant segments.

13. The computing device of claim 9, wherein the cloud gateway is configured by an orchestrator of the SD-WAN and the first and second service nodes are managed by a network virtualization management software.

14. The computing device of claim 9, wherein the states of the second plurality of T1-SRs are synchronized with the states of the first plurality of T1-SRs.

15. The computing device of claim 9, wherein when the first service node fails,
packets from the first tenant segment to the first and second tunnel endpoints are processed by the third set of T1-SRs and
packets from the second tenant segment to the first and second tunnel endpoints are processed by the fourth set of T1-SRs.

16. The computing device of claim 9, wherein when the second service node fails, the first service node receives packets from the cloud gateway to both the first and second tunnel endpoints to be processed at the first plurality of T1-SRs.

17. A non-transitory machine-readable medium storing a program for execution by at least one hardware processing unit, the program comprising sets of instructions for:
operating first and second service nodes to process packets from a cloud gateway of a software-defined wide area network (SD-WAN),
wherein the first service node comprises a first plurality of tenant service routers (T1-SRs) that includes a first set of T1-SRs dedicated to a first tenant segment and a second set of T1-SRs dedicated to a second tenant segment,
wherein the second service node comprises a second plurality of T1-SRs that includes a third set of T1-SRs dedicated to the first tenant segment and a fourth set of T1-SRs dedicated to the second tenant segment;
receiving, at the first service node, packets from the cloud gateway to a first tunnel endpoint to be processed at the first plurality of T1-SRs;
receiving, at the second service node, packets from the cloud gateway to a second tunnel endpoint to be processed at the second plurality of T1-SRs;
wherein when the first service node fails, the second service node receives packets from the cloud gateway to both the first and second tunnel endpoints to be processed at the second plurality of T1-SRs.

18. The non-transitory machine-readable medium of claim 17, wherein a T1-SR dedicated to the first tenant segment in the first plurality of T1-SRs has a same MAC address as a T1-SR dedicated to the first tenant segment in the second plurality of T1-SRs.

19. The non-transitory machine-readable medium of claim 17, wherein the first service node implements a first provider service router (T0-SR) for decapsulating and demultiplexing packets to the first plurality of T1-SRs and the second service node implements a second T0-SR for decapsulating and demultiplexing packets to the second plurality of T1-SRs.

20. The non-transitory machine-readable medium of claim 17, wherein each T1-SR of the first and third sets of T1-SRs is for applying a set of security policies specific to the first tenant segment to packets from the first tenant segments.

* * * * *